US010951300B2

(12) United States Patent
Kundargi et al.

(10) Patent No.: US 10,951,300 B2
(45) Date of Patent: Mar. 16, 2021

(54) RADIO FREQUENCY BEAM MANAGEMENT AND RECOVERY

(71) Applicant: National Instruments Corporation, Austin, TX (US)

(72) Inventors: Nikhil U. Kundargi, Austin, TX (US); Achim Nahler, Dresden (DE); James Wesley McCoy, Leander, TX (US)

(73) Assignee: National Instruments Corporation, Austin, TX (US)

( * ) Notice: Subject to any disclaimer, the term of this patent is extended or adjusted under 35 U.S.C. 154(b) by 40 days.

(21) Appl. No.: 16/100,753

(22) Filed: Aug. 10, 2018

(65) Prior Publication Data

US 2019/0053072 A1 Feb. 14, 2019

Related U.S. Application Data

(60) Provisional application No. 62/544,719, filed on Aug. 11, 2017.

(51) Int. Cl.
*H04W 16/28* (2009.01)
*H04B 7/0413* (2017.01)
(Continued)

(52) U.S. Cl.
CPC ......... *H04B 7/0814* (2013.01); *H04B 7/0413* (2013.01); *H04B 7/063* (2013.01);
(Continued)

(58) Field of Classification Search
CPC ... H04W 16/28; H04W 24/10; H04W 72/085; H04W 72/0413; H04B 7/0413;
(Continued)

(56) References Cited

U.S. PATENT DOCUMENTS 7,283,599 B1 10/2007 Herbig
8,325,755 B2 12/2012 Lee et al.
(Continued)

FOREIGN PATENT DOCUMENTS

WO WO2017084235 A1 5/2017
WO WO2017192889 A1 11/2017
WO WO2018026220 A1 2/2018

OTHER PUBLICATIONS

White Paper. "802.11ad—WLAN at 60 GHz & Technology Introduction" Rohde & Schwarz 1MA220_2e. Nov. 17, 2017 pp. 1-28.
(Continued)

*Primary Examiner* — Faisal Choudhury
(74) *Attorney, Agent, or Firm* — E. Alan Davis Alan Davis; James W. Huffman

(57) ABSTRACT

A base station (BS)/user equipment (UE) for performing radio frequency beam management and recovery in communication with a UE/BS. The BS/UE includes a processor and a memory that stores first and second thresholds. The processor evaluates a beam quality metric against the first and second thresholds, performs beam switching and/or beam broadening in response to determining the beam quality metric falls below the first threshold, and performs a beam failure recovery procedure in response to determining the beam quality metric falls below the second threshold.

19 Claims, 18 Drawing Sheets

(51) Int. Cl.
| | |
|---|---|
| *H04B 7/08* | (2006.01) |
| *H04B 17/382* | (2015.01) |
| *H04B 7/06* | (2006.01) |
| *H04W 24/10* | (2009.01) |
| *H04B 17/318* | (2015.01) |
| *H04B 17/21* | (2015.01) |
| *H04B 17/24* | (2015.01) |
| *H04L 12/26* | (2006.01) |
| *H04W 72/08* | (2009.01) |
| *H04W 72/04* | (2009.01) |
| *H04B 17/10* | (2015.01) |
| *H04L 5/00* | (2006.01) |

(52) U.S. Cl.
CPC ......... *H04B 7/0626* (2013.01); *H04B 7/0695* (2013.01); *H04B 17/21* (2015.01); *H04B 17/24* (2015.01); *H04B 17/318* (2015.01); *H04B 17/382* (2015.01); *H04L 43/16* (2013.01); *H04W 16/28* (2013.01); *H04W 24/10* (2013.01); *H04W 72/085* (2013.01); *H04B 7/0628* (2013.01); *H04B 17/101* (2015.01); *H04L 5/006* (2013.01); *H04L 5/0023* (2013.01); *H04L 5/0053* (2013.01); *H04W 72/0413* (2013.01)

(58) Field of Classification Search
CPC .... H04B 7/0814; H04B 7/0626; H04B 7/063; H04B 7/0695; H04B 17/21; H04B 17/24; H04B 17/318; H04B 17/382; H04B 17/101; H04L 43/16
USPC ......................................................... 370/216
See application file for complete search history.

(56) References Cited

U.S. PATENT DOCUMENTS

| | | | |
|---|---|---|---|
| 8,457,252 | B2 | 6/2013 | Liu |
| 9,191,161 | B2 | 11/2015 | Li et al. |
| 9,935,794 | B1 | 4/2018 | Cao et al. |
| 2005/0261028 | A1 | 11/2005 | Chitrapu |
| 2006/0182015 | A1 | 8/2006 | Kim |
| 2007/0206707 | A1 | 9/2007 | Chen |
| 2008/0279306 | A1 | 11/2008 | van Zelst et al. |
| 2013/0094548 | A1 | 4/2013 | Park |
| 2013/0286960 | A1* | 10/2013 | Li ....................... H04W 72/042 370/329 |
| 2014/0098689 | A1 | 4/2014 | Lee et al. |
| 2015/0237617 | A1 | 8/2015 | Chen |
| 2015/0326286 | A1 | 11/2015 | Wong et al. |
| 2015/0326291 | A1 | 11/2015 | Wong et al. |
| 2015/0326383 | A1 | 11/2015 | Wong et al. |
| 2016/0134352 | A1 | 5/2016 | Stirling-Gallacher |
| 2016/0211898 | A1 | 7/2016 | Cai |
| 2016/0337916 | A1 | 11/2016 | Deenoo et al. |
| 2016/0353510 | A1* | 12/2016 | Zhang ..................... H04L 43/16 |
| 2017/0026844 | A1 | 1/2017 | Baldemair et al. |
| 2017/0026938 | A1 | 1/2017 | Onggosanusi et al. |
| 2017/0207845 | A1 | 7/2017 | Moon et al. |
| 2017/0290013 | A1 | 10/2017 | McCoy et al. |
| 2017/0324459 | A1 | 11/2017 | Koskela et al. |
| 2017/0346545 | A1 | 11/2017 | Islam et al. |
| 2017/0367046 | A1 | 12/2017 | Papasakellariou |
| 2018/0042028 | A1 | 2/2018 | Nam et al. |
| 2018/0062724 | A1 | 3/2018 | Onggosanusi et al. |
| 2018/0097556 | A1 | 4/2018 | Nagaraja et al. |
| 2018/0123648 | A1 | 5/2018 | Nagaraja et al. |
| 2018/0198580 | A1 | 7/2018 | Nammi et al. |
| 2018/0198651 | A1 | 7/2018 | Kundargi et al. |
| 2018/0227035 | A1 | 8/2018 | Cheng et al. |
| 2018/0227094 | A1 | 8/2018 | Liu et al. |
| 2018/0234959 | A1 | 8/2018 | Ahn et al. |
| 2018/0279286 | A1* | 9/2018 | Akoum ............... H04W 72/046 |
| 2018/0287759 | A1 | 10/2018 | Kundargi et al. |
| 2018/0317214 | A1 | 11/2018 | Ding et al. |
| 2018/0324678 | A1 | 11/2018 | Chen et al. |
| 2019/0052344 | A1 | 2/2019 | Kundargi et al. |
| 2019/0074880 | A1 | 3/2019 | Frenne et al. |
| 2019/0090205 | A1 | 3/2019 | Gong et al. |
| 2019/0104549 | A1 | 4/2019 | Deng et al. |
| 2019/0132827 | A1 | 5/2019 | Kundargi et al. |
| 2019/0132828 | A1 | 5/2019 | Kundargi et al. |
| 2019/0199412 | A1* | 6/2019 | Koskela ................ H04B 7/088 |
| 2019/0349915 | A1* | 11/2019 | Ahn ...................... H04L 5/0048 |
| 2020/0059398 | A1* | 2/2020 | Pan .................... H04W 72/0413 |
| 2020/0092785 | A1* | 3/2020 | Yang .................... H04W 76/19 |
| 2020/0252184 | A1 | 8/2020 | Kundargi et al. |
| 2020/0344023 | A1 | 10/2020 | Kundargi et al. |

OTHER PUBLICATIONS

Serpedin, Erchin et al. "Performance Analysis of Blind Carrier Phase Estimators for General QAM Constellations." IEEE Transactions on Signal Processing. vol. 49, No. 8. Aug. 2001. pp. 1816-1823.

Moeneclaey, Marc et al. "ML-Oriented NDS Carrier Synchronization for General Rotationally Symmetric Signal Constellations." IEEE Transactions on Communications, vol. 42, No. 8, Aug. 1994. pp. 2531-2533.

Thomas, Timothy et al. "Blind Phase Noise Mitigation for a 72 GHz Millimeter Wave System." IEEE ICC 2015 SAC-Millimeter-wave Communications. 2015 pp. 1352-1357.

Vieira et al. "Reciprocity Calibration Methods for Massive MIMO Based on Antenna Coupling." Department of Electrical Engineering, Lund University. 5pp Jan. 1, 2014.

Harris, "University of Bristol and Lund University Partner with NI to Set World Records in 5G Wireless Spectral Efficiency Using Massive MIMO." 7 pp. May 2016.

"LTE in a Nutshell—Physical Layer." Telesystem Innovations Inc. White Paper. 18pp. 2010.

"An Introduction to Orthogonal Frequency Division Multiplex Technology." Keithley Instruments, Inc. 66pp. 2008.

Huawei et al. "WF on CSI Acquisition in NR." 3GPP TSG RAB WGI Meeting #85, 4pp. May 27, 2016.

Huawei et al. "WF on CSI Acquisition Framework in Nr." 35PP TSG RAN WGI Meeting #85, 3pp. May 27, 2016.

"Study on Latency Reduction Techniques for LTE." 3GPP TR 36.881 Technical Report, 92pp. Feb. 2016.

"Study on Scenarios and Requirements for Next Generation Access Technologies." 3GPP TR 38.913 Technical Report, 19pp. Feb. 2016.

Vieira et al. "A Flexible 100-antenna Testbed for Massive MIMO." Department of Electrical and Information Technology at Lund University. 7pp. Jan. 1, 2014.

"Bristol and Lund set a New World Record in 5G Wireless Spectrum Efficiency." University of Bristol News. 6pp. Mar. 23, 2016.

"Study on NR New Radio Access Technology." 3GPP TSG RAN Meeting #71, 8pp. Mar. 2016.

Working Group Communication Architectures and Technologies. "LTE Small Cell Enhancement by Dual Connectivity." Wireless World Research Forum. 22pp. Nov. 2014.

White Paper. "LTE in a Nutshell: Protocol Architecture." Telesystem Innovations Inc. 12pp. 2010.

"LTE Random Access Procedure." EvenHelix.com Inc. 5pp. 20105.

Luther "5G Massive MIMO Testbed: From Theory to Reality." National Instruments. Jun. 8, 2016. pp. 1-11.

"Introduction to the NI mmWave Transceiver System Hardware." National Instruments. Apr. 20, 2016. pp. 1-8.

"National Instruments Wireless Research Handbook." National Instruments. May 2016, pp. 1-37.

Shepard et al. "Argos: Practical Many-Antenna Base Stations." MobiCom 12, Aug. 22-26, 2012. Istanbul, Turkey. pp. 53-64.

Khoolenjani et al. "Distribution of the Ratio of Normal and Rice Random Variables." Digital Commons ®WayneState, Journal of Modern Applied Statistical Methods, vol. 12, Is2, Article 27. Nov. 1, 2013. pp. 1-15.

(56) References Cited

OTHER PUBLICATIONS

Shen et al. "Channel Estimation in OFDM Systems" Freescale Semiconductor, Inc. Application Note. Jan. 2006 pp. 1-16.
"Study of Time & Frequency Density of UE-Specific & Cell-Specific Phase Noise RS with Different CPE Estimation Techniques." National Instruments, 3GPP TSG RAN WG1 NR Ad-Hoc Meeting, Spokane, WA, USA. Jan. 16-20, 2017. R1-1700854. pp. 1-12.
"Discussion on Signaling for PT-RS." National Instruments, 3GPP TSG RAN WG1 Meeting #88bis, Spokane, WA, USA. Apr. 3-7, 2017. R1-1705253. pp. 1-10.
Ng, Boon Loong. "5G NR mmWAVE Standards." Samsung Research America Keynote. Jul. 2017 pp. 1-10.
"Study on New Radio Access Technology Physical Layer Aspects." 3GPP A Global Initiative. 3rd Generation Partnership Project; Technical Specification Group Radio Access Network. 3GPP TR 38.802 V14.0.0. Mar. 2017. pp.15-17.
"Beam Management Considerations for Above 6 GHz NR." MediaTek Inc. 3GPP TSG RAN WG1 Meeting #86, Gothenburg, Sweden. Aug. 22-26, 2016. R1-167543. pp. 1-4.
BPL Definition and Characteristics defined within an email between Zhangxi and Mihai Enescu. PDF downloaded on Mar. 22, 2018 from https://list.etsi.org/scripts/wa.exe?A3=ind1704A & L=3GPP_TSG_RAN_WG1_NR & E=base64 & P=105463584 & B=---_000_HE1PR0701MB2074406F6853497D0CA12813996-D0HE1PR0701MB2074_& T=text%2Fhtml;%20charset=utf-8& pending=.
"Final Report of 3GPP TSG RAN WG1 #88bis v1.0.0" MCC Support. 3GPP TSG RAN WG1 Meeting #89, Hangzhou, China. May 15-19, 2017. pp. 1-7. Downloaded from http://www.3gpp.org/ftp/tsg_ran/WG1_RL1/TSGR1_88b/Report/Final_Minutes_report_RAN1%2388b_v100.zip.
"Final Report of 3GPP TSG RAN WG1 #89 v1.0.0" MCC Support. 3GPP TSG RAN WG1 Meeting #90. Prague, Czech Rep. Aug. 21-25, 2017. pp. 1-8. Downloaded from http://www.3gpp.org/ftp/tsg_ran/WG1_RL1/TSGR1_89/Report/Final_Minutes_report_RAN1%2389_v100.zip.
"Final Report of 3GPP TSG RAN WG1 #AH_NR2 v1.0.0" MCC Support. 3GPP TSG RAN WG1 Meeting #90. Qingdao, China. Jun. 27-30, 2017. pp. 1-8. Downloaded from http://www.3gpp.org/ftp/tsg_ran/WG1_RL1/TSGR1 _AH/NR_AH_1706/Report/Final_Minutes_report_RAN1%23AH_NR2_v100.zip.
"Discussion on Nested Usage of RS for Beam Measurement" National Instruments. 3GPP TSG RAN WG1 Meeting #89. Hangzhou, P.R. China May 15-19, 2017. pp. 1-5 Downloaded from http://www.3gpp.org/ftp/tsg_ran/WG1_RL1/TSGR1_89/Docs/R1-1708270.zip.
"On Remaining Aspects of Beam Recovery" National Instruments. 3GPP TSG RAN WG1 Meeting #90. Prague, Czech Republic, Aug. 21-25, 2017. pp. 1-10. Downloaded from http://www.3gpp.org/ftp/tsg_ran/WG1_RL1/TSGR1_90/Docs/R1-1714180.zip.
Qualcomm. "Beam Management for NR." R1-1705581 3rd Generation Partnership Project (3GPP) vol. RAN WG1. Apr. 2, 2017. pp. 1-7 Retrieved from http://www.3gpp.org/ftp/Meetings_3GPP_SYNC/RAN1/Docs/.
Catt. "Details of Downlink Beam Management." R1-1704551 3rd Generation Partnership Project (3GPP) vol. RAN WG1. Feb. 4, 2017. pp. 1-8. Retrieved from http://www.3gpp.org/ftp/Meetings_3GPP_Sync/RAN1/Docs/.
Samsung."RRM Measurement in NR: The Details of Filtering." R2-1703721 3rd Generation Partnership Project (3GPP). vol. RAN WG2. Apr. 03, 2017. pp. 1—Retrieved from http://www.3gpp.org/ftp/Meetings_3GPP_SYNC/RAN2/Docs/.

* cited by examiner

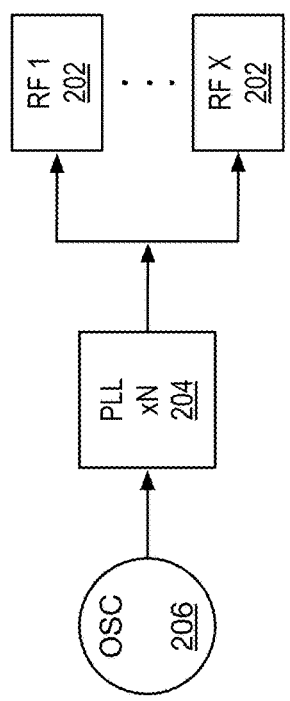
FIG. 7
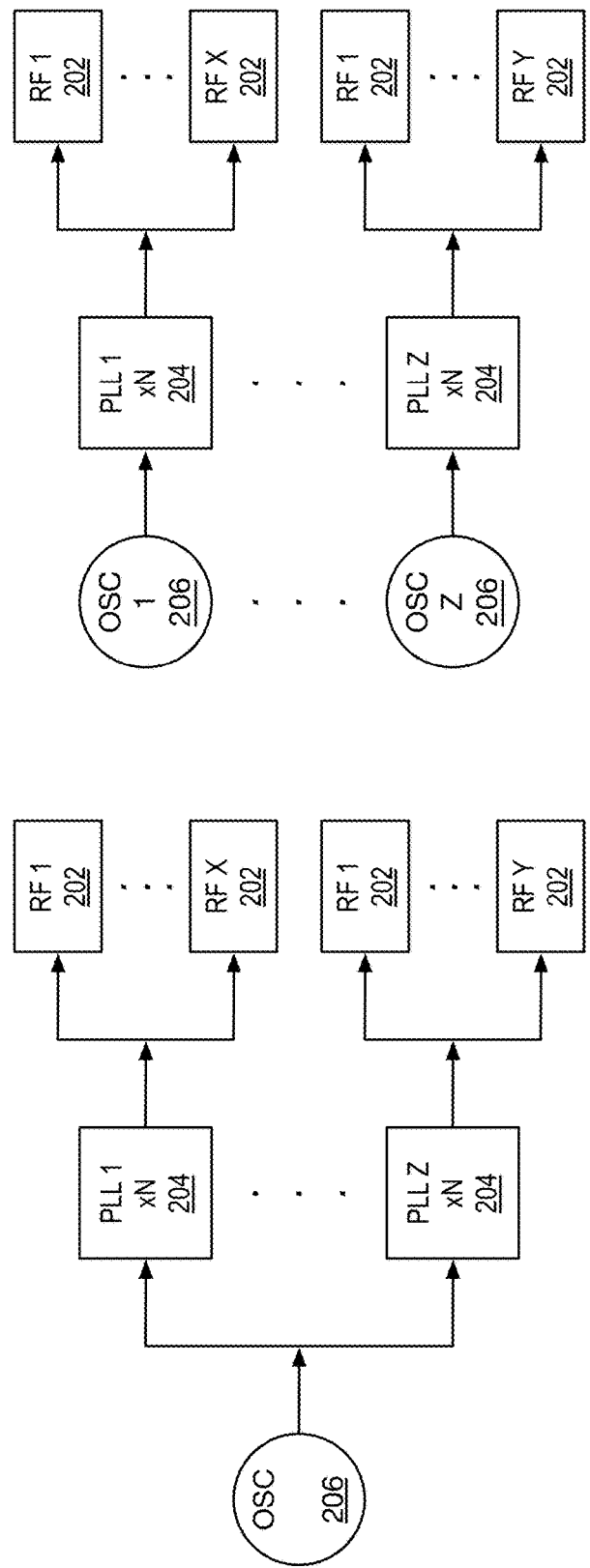
FIG. 9
FIG. 8

FIG. 11B

FROM FIG. 6A →

AT EACH UE SCHEDULED IN THAT TTI, DO THE FOLLOWING IN THE SYMBOLS THAT HAVE PTRS (SPECIAL CASE IS IF EVERY PDSCH SYMBOL HAS A PTRS):
* ESTIMATE CPE PER SPATIAL STREAM USING ALL THE PTRS IN THE SCHEDULED RESOURCE BLOCKS FOR THAT UE
* PTRS FROM SPATIAL STREAMS NOT MEANT FOR THE GIVEN UE ARE ALSO USED IF POSSIBLE (THIS IS OPTIONAL). IF NOT, LIMIT THE CPE ESTIMATES TO SPATIAL STREAM MEANT FOR THAT UE ONLY
606

→

AT EACH UE SCHEDULED IN THAT TTI, IF ADDITIONAL (NON FRONT LOADED) DMRS SYMBOL PRESENT:
* ESTIMATE CPE PER SPATIAL STREAM USING ALL THE DMRS IN THE SCHEDULED RESOURCE BLOCK FOR THAT UE
* DMRS FROM SPATIAL STREAMS NOT MEANT FOR THE GIVEN UE/DMRS SUBGROUP ARE ALSO USED IF POSSIBLE (THIS IS OPTIONAL). IF NOT, LIMIT THE CPE ESTIMATES TO SPATIAL STREAM MEANT FOR THAT UE/DMRS SUBGROUP ONLY
608

→

IF SOME SYMBOLS IN THE TTI CONTAIN A CSI-RS TRANSMISSION:
* USE CSI-RS TO DERIVE CPE IF SUFFICIENT NUMBER OF CSI-RS ARE AVAILABLE TO ACHIEVE RELIABLE CPE ESTIMATION
609

→

AT EACH UE SCHEDULED IN THAT TTI, IF PDSCH SYMBOL HAS NO DMRS OR PTRS OR CSI-RS, THEN ESTIMATE THE CPE WITH BLIND METHOD
* THIS IS DONE ONLY IN SPATIAL STREAM MEANT FOR THAT UE.
611

→ TO FIG. 6C

RADIO FREQUENCY BEAM MANAGEMENT AND RECOVERY

CROSS REFERENCE TO RELATED APPLICATION(S)

This application claims priority based on U.S. Provisional Application, Ser. No. 62/544,719, filed Aug. 11, 2017, entitled BEAM MANAGEMENT FOR MMWAVE IN NEW RADIO, which is hereby incorporated by reference in its entirety.

This application is related to the following U.S. Non-Provisional Applications, each of which is hereby incorporated by reference in its entirety.

| Serial No. (Docket No.) | Filing Date | Title |
|---|---|---|
| 15/855,148 (NATI.018) | Dec. 27, 2017 | COMMON PHASE ERROR (CPE) COMPENSATION FOR FREQUENCY DIVISION MULTIPLEX (FDM) SYMBOLS IN WIRELESS COMMUNICATION SYSTEMS |
| 15/940,103 (NATI.019) | Mar. 29, 2018 | WIRELESS COMMUNICATION SYSTEM THAT PERFORMS MEASUREMENT BASED SELECTION OF PHASE TRACKING REFERENCE SIGNAL (PTRS) PORTS |
| 15/969,883 (NATI.020) | May 3, 2018 | WIRELESS COMMUNICATION SYSTEM THAT PERFORMS BEAM MANAGEMENT USING NESTED REFERENCE SIGNALS |
| 15/969,923 (NATI.030) | May 3, 2018 | WIRELESS COMMUNICATION SYSTEM THAT PERFORMS BEAM REPORTING BASED ON A COMBINATION OF REFERENCE SIGNAL RECEIVE POWER AND CHANNEL STATE INFORMATION METRICS |
| 16/100,854 (NATI.031) | Aug. 10, 2018 | RADIO FREQUENCY BEAM MANAGEMENT AND FAILURE PRE-EMPTION |

BACKGROUND

The disclosed embodiments relate to mobile telecommunications.

The New Radio (NR) definition in 3GPP ($3^{rd}$ Generation Partnership Project) for mobile systems will encompass a variety of deployment scenarios envisioned for 5G (fifth generation) mobile communication systems. MIMO (multiple input, multiple output) communication systems can be used for 5G TDD (time division duplex) air interfaces. Flexible (scalable) frame structures are being considered for block symbol transmissions within the new 5G cellular communication standard including various frame structure parameters such as FFT (fast Fourier transform) size, sample rate, and subframe length. Beam based transmission schemes can be used for directional 5G communication links.

FIG. 1 (Prior Art) is a diagram of an example embodiment including a base station 102 with M antennas 104 that provides a wireless MIMO communication system 100. The MIMO base station 102 communicates through its M antennas 104 with K different user equipment (UE) devices 106, such as mobile handsets, having one or more antennas 108. Spectral efficiency is improved by using massive MIMO communication systems having base stations with relatively large numbers of antennas. Example embodiments for massive MIMO communication systems are described within U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety.

BRIEF SUMMARY

In one aspect the present invention provides a method for performing radio frequency beam management and recovery in communication between a base station (BS) and a user equipment (UE). The method includes configuring first and second thresholds, evaluating a beam quality metric against the first and second thresholds, performing beam switching and/or beam broadening in response to determining the beam quality metric falls below the first threshold, and performing a beam failure recovery procedure in response to determining the beam quality metric falls below the second threshold.

In another aspect, the present invention provides a base station (BS)/user equipment (UE) for performing radio frequency beam management and recovery in communication with a UE/BS. The BS/UE includes a processor and a memory that stores first and second thresholds. The processor evaluates a beam quality metric against the first and second thresholds, performs beam switching and/or beam broadening in response to determining the beam quality metric falls below the first threshold, and performs a beam failure recovery procedure in response to determining the beam quality metric falls below the second threshold.

In yet another aspect, the present invention provides a non-transitory computer-readable medium having instructions stored thereon that are capable of causing or configuring a computing system to perform operations for performing radio frequency beam management and recovery in communication between a base station and a user equipment (UE). The operations include configuring first and second thresholds, evaluating a beam quality metric against the first and second thresholds, performing beam switching and/or beam broadening in response to determining the beam quality metric falls below the first threshold, and performing a beam failure recovery procedure in response to determining the beam quality metric falls below the second threshold.

BRIEF DESCRIPTION OF THE DRAWINGS

It is noted that the appended drawings illustrate only exemplary embodiments and are, therefore, not to be considered limiting of the scope of the present inventions, for the inventions may admit to other equally effective embodiments.

FIGS. 7-9 are block diagrams that provide example embodiments for different implementations where clock signals and related circuitry are used as LOs for RF channels within downlink (DL) and/or uplink (UL) circuitry for base stations or UEs.

FIGS. 11A-C is a flow diagram that provides an example for performing the PN correlation at the UEs and for the feedback of these correlations from the UE to the base station.

DETAILED DESCRIPTION OF THE EMBODIMENTS

Figure 1:
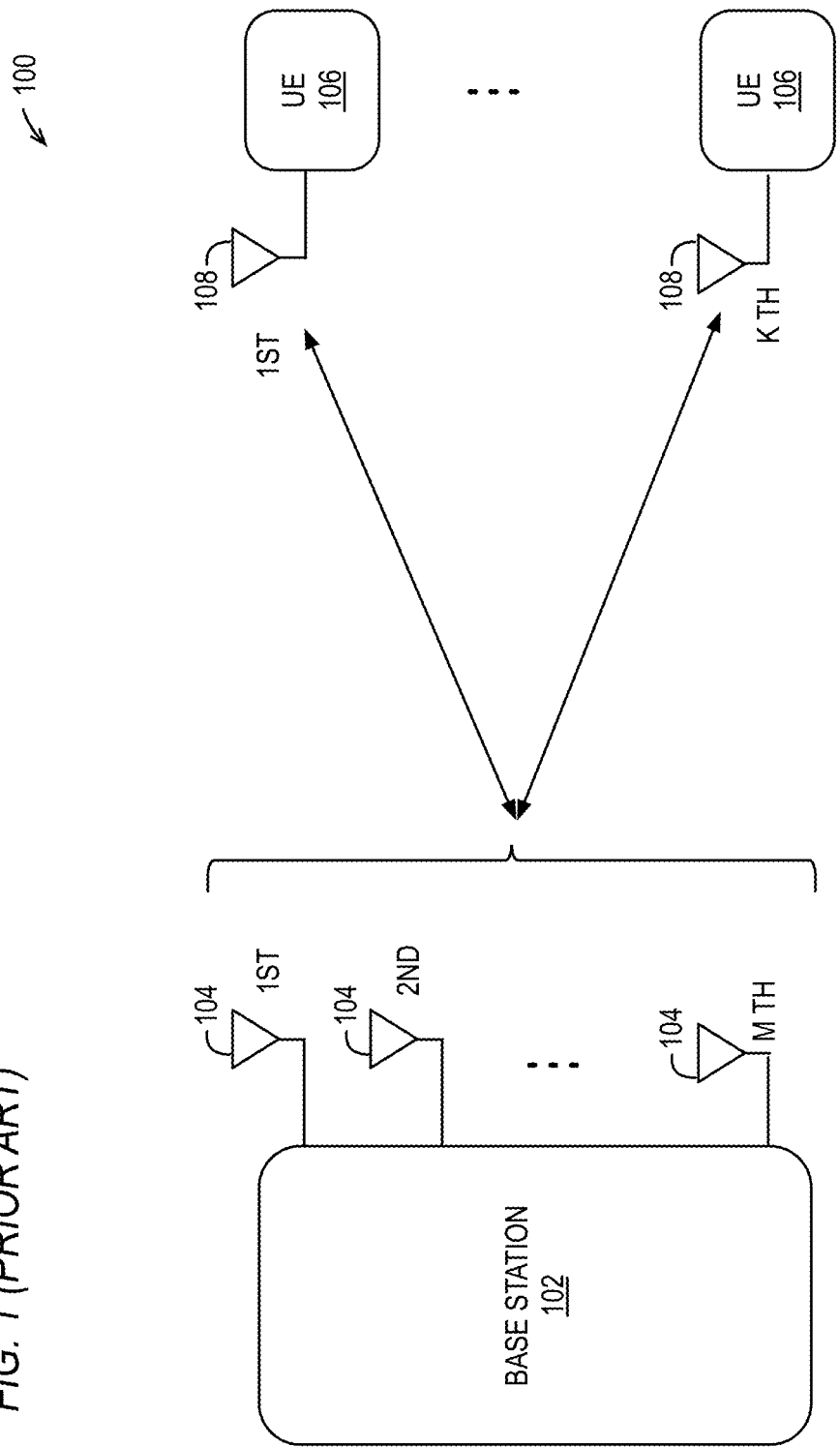
FIG. 1 (Prior Art) is a diagram of an example embodiment including a base station with M antennas that provides a wireless beam formed MIMO communication system.
Figure 2A:
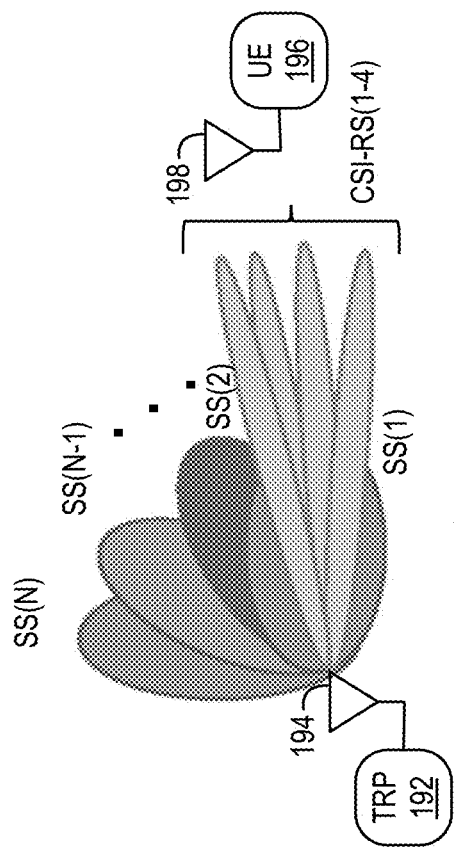
FIGS. 2A-B are diagrams that provide example embodiments for selection of wide beam and narrow beam reference signals, respectively.

The disclosed embodiments provide systems and methods for nested reference signal (RS) designs for beam management in wireless communications systems. The proposed embodiments can include, for example, one or more of the following:

1. Construction of the beam set of reference signals (RSs) such that the RSs used for coarse beam selection are linked to the RSs used for fine beam selection in a unique manner. For one example embodiment for NR solutions, SS (Synchronization Signals) and/or wide beam CSI-RS (Channel State Information—Reference Signal) are used for coarse beam selection, and narrow beam CSI-RS are used for fine beam selection.

2. Indication of the linkage between the selected coarse beam RSs and fine beam RSs is used by the UE (user equipment), and further linkage to the PDCCH (physical downlink control channel) and PDSCH (physical downlink shared channel) beams is also used. For one example embodiment, this linkage indication is performed via signaling of quasi co-location (QCL) assumptions. For one further example embodiment, this is done via implicit indication to the UE from the base station such as a gNB (gNodeB) in the NR definition.

3. Beam reporting is implemented based upon a combination of RSRP (reference signal receive power) and CSI (channel state information) metrics. For one example embodiment, this beam reporting can include a UE reporting its CSI computation capability to the base station (e.g., gNB).

Other variations can also be implemented while still taking advantage of the techniques described herein.

It is noted that for certain wireless MIMO communication systems such as NR implementations, SS (synchronization signal) blocks are used. The SS is transmitted in a beam-sweeping manner over a narrow bandwidth with respect to legacy omni-directional/sectoral LTE beams, although the bandwidth of the SS may be wide relative to narrow beam CSI-RS. The periodicity of this beam sweep is called an SS burst set. The typical order of this periodicity is tens of milliseconds. While the primary purpose of the SS is for initial access, SS can be used for beam management in CONNECTED state UEs also. The SS acts as an always "on" and cell wide signal. The beam set represents the SS beams selected by the gNB (gNodeB) or other base station so that it can finish sweeping all of the available beam directions in a reasonably small number of beams and in a relatively small amount of time to reduce the beam selection and initial access latency. In order to do this, the beams either can be narrow beams where only a subset of all available narrow beams are sampled or can be wider beams that fully cover all available narrow beam directions. Beam reporting is the reporting of the measured beam metrics by the UE back to the gNB. This beam reporting is used by gNB to assign a beam to the UE. The simplest and most common metric is beam RSRP (Reference Signal Receive Power). This is simply the receive power of the RS over a certain receive BW (bandwidth).

Embodiments for nested reference signal (RS) designs for beam management in wireless communications systems will now be described in more detail.

Construction of Beam Sets Linking Coarse Beam Selection to Fine Beam Selection

For one example embodiment, construction of the beam set of reference signals (RS) is performed such that the RS used for coarse beam selection is linked to the RS used for fine beam selection in a unique manner. For this embodiment, the TX (transmit) beam selection happens through a two stage process.

For Stage 1, a coarse beam is selected via beam sweeping. (This corresponds to the P1 procedure as defined in NR.) For Stage 2 after the coarse beam direction has been found, the beam direction is refined to find the fine beam. This fine beam will then be used for further transmissions to the UE in the PDCCH and PDSCH beams. (This corresponds to the P2 procedure as defined in NR.)

In order to aid the coarse-to-fine beam selection, it is proposed to construct the RS that is used such that there is a nested structure of the RS beams. More specifically, it is proposed that either the wide beam SS or the wide beam CSI-RS is used as the RS for the coarse beams, and the narrow beam CSI-RS is used as the RS for the fine beams. It is noted, however, that other options are not precluded and could still be used.

For one example embodiment, the beam set is constructed as follows:

First, the N different wide beam RSs are designed such that they will cover the entire beam sweeping area of interest.

Then, for the $n^{th}$ wide beam RS, M different fine beam RSs are designed such that the beam direction of the fine beam RS is subsumed (covered) by the $n^{th}$ wide beam RS. Here n is a particular instance of the wide beam RS and can be from 1 up to N, and the total number of fine beam RS can be N times M. In other words, if the UE receives one of these M fine beam RSs as its strongest measured fine beam RS, then it will also correspondingly select the $n^{th}$ wide beam RS as its strongest measured wide beam RS. In this example embodiment, all wide beams have the same number of narrow beams. The method is not limited to this example but each wide beam can have a different number of narrow beams. It is also noted the "M" and "N" are positive integers for this embodiment.

Figure 3A:
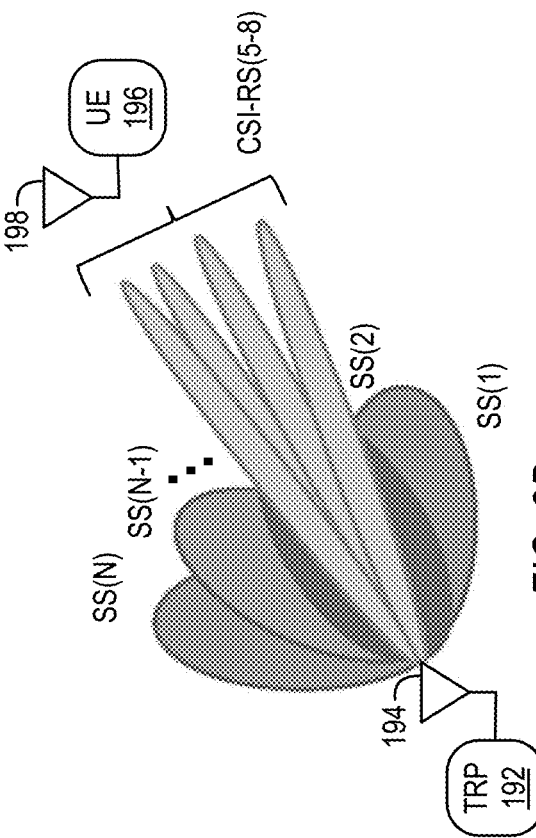
FIGS. 3A-B are diagrams that provide example embodiments for narrow beam reference signals that correspond to different wide beam reference signals.
Figure 2B:
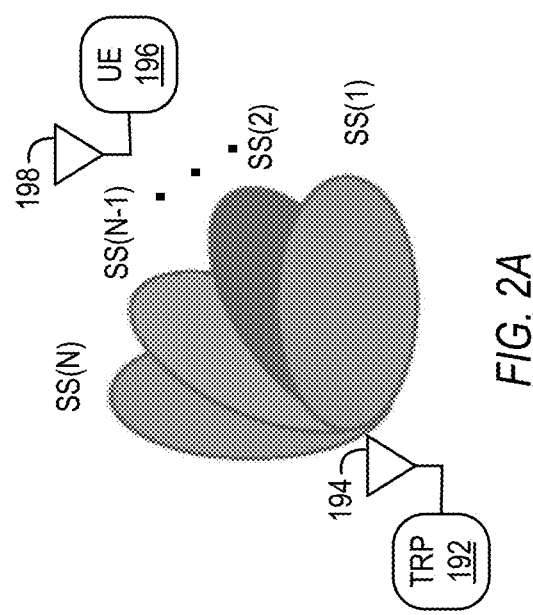
Figure 3B:
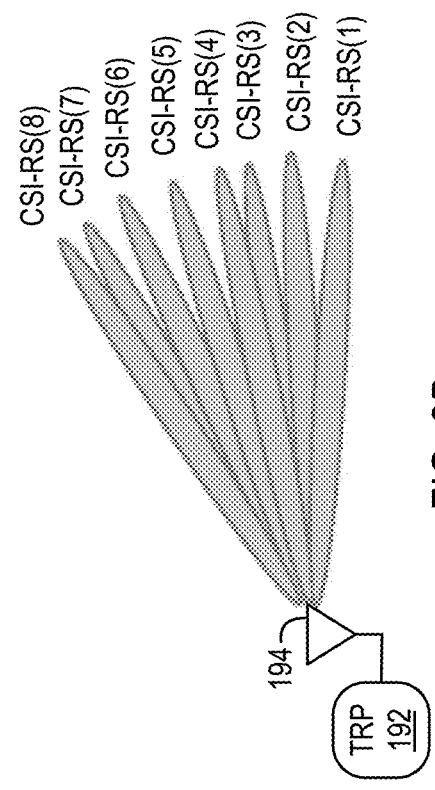

FIGS. 2A-B and FIGS. 3A-B provide example embodiments for this coarse-to-fine beam selection. Looking first to FIG. 2A, wide beam RSs are provided by a TRP (transmit/receive point) 192 with antenna 194 using N different SSs, denoted SS(1), SS(2) through SS(N). For FIG. 2B, eight (8) different fine beam RSs are provided by a TRP 192 using CSI-RSs, denoted CSI-RS(1), CSI-RS(2) through CSI-RS (8). In FIG. 3A, CSI-RS numbers 1-4 correspond to one of the SS beams, namely SS beam number 1, SS(1). In FIG. 3B, CSI-RS numbers 5-8 correspond to one of the SS beams, namely SS beam number 2, SS(2). The various beams are received by a UE 196 having antenna 198.

Indication of Linkage to UE and Further Linkage to PDCCH/PDSCH Beams

For one example embodiment, indication of the linkage between the coarse and fine beam selection RS is provided to the UE, and further linkage to the PDCCH and PDSCH beams is used. As seen above, the linkage is unique between the coarse and fine beam selection RSs. However, the UE does not know this linkage a priori. A method is proposed to indicate this linkage information to the UE.

The UE knows the SS beam number and direction as it is periodically transmitted in a known manner for NR implementations. This periodicity as well as the manner of transmission can be deduced by the UE by receiving the System Information (SI) broadcast in the SS blocks (e.g., in the PBCH (physical broadcast channel) part of the SS block). The CSI-RS beams, however, are not known to the UE. These can be UE specific or UE Group specific or cell specific. Without prior knowledge about these CSI-RS beams, the UE cannot determine how they correspond to the SS beam.

The following implicit linkage and/or explicit linkage techniques can be used for this linkage although other methods could also be used.

Implicit Linkage via Nesting Structure Design—Linkage can be implicitly indicated via nesting structure design. Each Beam Pairing between the TRP and UE, which is also called a Beam Pair Link (BPL), is expected to have a unique BPL tag/identifier (ID). The tag/ID of each beam is designed to encode in it the nesting structure, and the SS beam identifier that it corresponds to. As an example, there can be twenty (20) SS beams each corresponding to a unique symbol or slot within a SS burst set periodicity. Each SS beam will have a set of BPL tags/IDs and one out of that set is allotted to a CSI-RS that is linked to that SS beam. One alternative method to encode this implicit linkage is to use the choice of CSI-RS sequences. The set of CSI-RS sequences is initialized or chosen based on the SS beam that the CSI-RS beam corresponds to. In this manner there is implicit indication of the coarse and fine beams.

Explicit Linkage via CSI-RS Configuration—Linkage can be explicitly indicated via CSI-RS configuration. In this option, the linkage of CSI-RS beam to SS beam is indicated using an explicit signaling of a QCL (quasi co-location) assumption between the coarse and fine beams. This QCL will be a quasi co-location of only the spatial parameters of the two beams. For each CSI-RS that is configured for the UE in either UE specific or UE Group specific or cell specific, the spatial QCL with one of the coarse beam (SS) is indicated as part of the CSI-RS configuration message.

In one embodiment, the linkage is one of a set of possible linkages may be configured to the UE as a Transmission Configuration Indication (TCI) state parameter (TCI-States). Each configured TCI state may include one reference signal (RS) set TCI-RS-SetConfig. Each TCI-RS-SetConfig may contain parameters for configuring a QCL relationship between the reference signals in the RS set and the demodulation reference signal (DM-RS) port group of the physical downlink shared channel (PDSCH) between the BS and UE. The QCL-TypeD may be used to indicate the QCL relationship with respect to spatial receive parameter between the two RS.

In one embodiment, the linkage may be indicated to the UE in the downlink control information (DCI) message for the UE when the UE is configured with a higher layer parameter TCI-PresentInDCI that is set as enabled for the Control Resource Set (CORESET) scheduling a PDSCH between the BS and UE. CORESET is the set of resource elements in which a physical downlink control channel (PDCCH) can be sent to the UE.

Beam Reporting Based on a Combination of RSRP and CSI Metrics

For further embodiments, the CSI metric of one or more beams can also be reported by the UE to the gNB during the beam management procedure. This CSI metric will be in addition to the RSRP metric reported for the beams. The CSI report includes one or more of Channel Quality Information (CQI), Rank Information (RI), Precoder Matrix Information (PMI), and/or other reported information.

It is noted that it can be computationally intensive for a UE to compute the CSI metric for each beam. Further for the NR standard, UEs also fall within differing categories where the category of the UE corresponds to its target application and is predefined in the NR standard. Depending on the UE category, the UE may have a differing ability to compute multiple CSIs as the beam selection metric.

To address this potential issue for certain embodiments, each UE is configured to indicate its CSI computation capabilities to the gNB, and the gNB then takes these capability reports into account and configures the UE to report a specific number of CSIs in every beam reporting instance. The UE capability report can be hard coded into the UE Category which is fixed for a given UE. Or, the UE computation capability can be indicated during UE initial access process by the UE to the gNB in a dynamic manner. Further, as such beam management is envisioned to be required primarily above 6 GHz operation, compatibility with sub 6 GHz operation of NR is ensured. Hence, the UE may determine whether or not the computation capability indication is supported via the system configuration contained in the System Information that is broadcast by the gNB. Further, the UE may compute the additional CSIs each time it does a beam measurement as part of a beam management procedure. It is noted that in this method, the CSI is computed, reported and used for the purposes of beam selection only. Also, the gNB scheduler will take into account the reported Ranks and CQIs of multiple beams to make the final selection on the beam that the UE will be configured with for further data and control channel transmissions. This will be supplemental information to the scheduler, which is in addition to the RSRP measurements that the scheduler will have for these and/or more beams.

Figure 4:
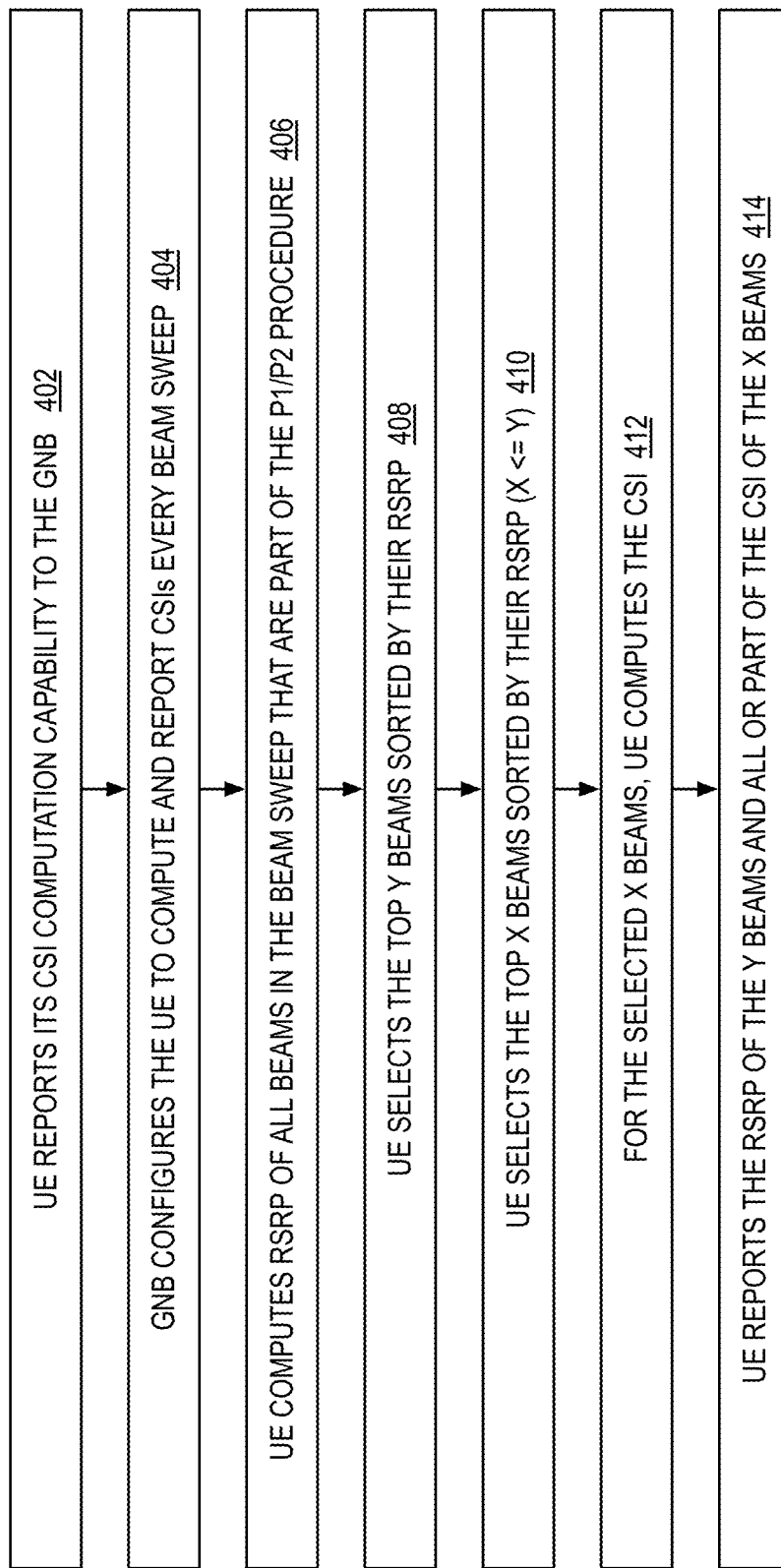
FIG. 4 is a flowchart that provides an example embodiment where a UE reports its computational capabilities and the base station (e.g., gNodeB (gNB)) uses this information to configure beam reporting and the UE performs beam measurement and reporting based on this configuration.

FIG. 4 provides an example embodiment 400 where a UE reports its computational capabilities and the base station (gNB) uses this information to configure beam reporting. In block 402, the UE reports its CSI computation capability to the gNB. In block 404, the gNB configures the UE to compute and report CSIs every beam sweep. In block 406, the UE computes RSRP of all beams in the beam sweep, which are part of the P1/P2 procedure in NR. In block 408, the UE selects the top Y number of beams sorted by their RSRP. In block 410, the UE selects the top X number of beams sorted by their RSRP (X≤Y). In block 412, for the selected X beams, UE computes the CSI. In block 414, the UE reports the RSRP of the Y beams and all or part of the CSI of the X beams. It is noted the "X" and "Y" are positive integers for this embodiment. It is also noted that different and/or additional process steps could also be included while still taking advantage of the techniques described herein.

In one embodiment, the UE may perform physical layer (Layer 1) processing that is UE implementation-specific. The physical layer processing may include physical layer filtering. In one embodiment, the UE may perform network layer (Layer 3) processing configured to the UE via Radio Resource Control (RRC) configuration. The network layer processing may include network layer filtering.

It is noted that the disclosed embodiments can be used with respect to a variety of OFDM-based transmission schemes for RF communication systems. It is also noted that as used herein, a "radio frequency" or RF communications means an electrical and/or electro-magnetic signal conveying useful information and having a frequency from about 3 kilohertz (kHz) to thousands of gigahertz (GHz) regardless of the medium through which such signal is conveyed. The OFDM-based transmissions may be transmitted through a variety of mediums (e.g., air, free space, coaxial cable, optical fibers, copper wire, metal layers, and/or other RF transmission mediums). As one example, the disclosed embodiments could be used millimeter (mm) wave transmissions between 30-300 GHz having wavelengths of 1-10 mm (e.g., a transmission range of 71-76 GHz) if OFDM-based modulation were used for the mm wave transmissions. In addition, the disclosed embodiments will likely be useful for 5G solutions up to 40 GHz where OFDM-based modulations are more likely to be implemented. For example, 5G frequency ranges and bands around 28 GHz, 39 GHz, and/or other frequency ranges or bands where OFDM-based modulation is used for RF transmissions will benefit from the disclosed techniques. It is further noted that example wireless communication systems within which the disclosed techniques can be applied are also described in U.S. Published Patent Application No. 2015-0303936 (Ser. No. 14/257,944) and U.S. Published Patent Application No. 2015-0305029 (Ser. No. 14/691,339), each of which is hereby incorporated by reference in its entirety.

Figure 5:
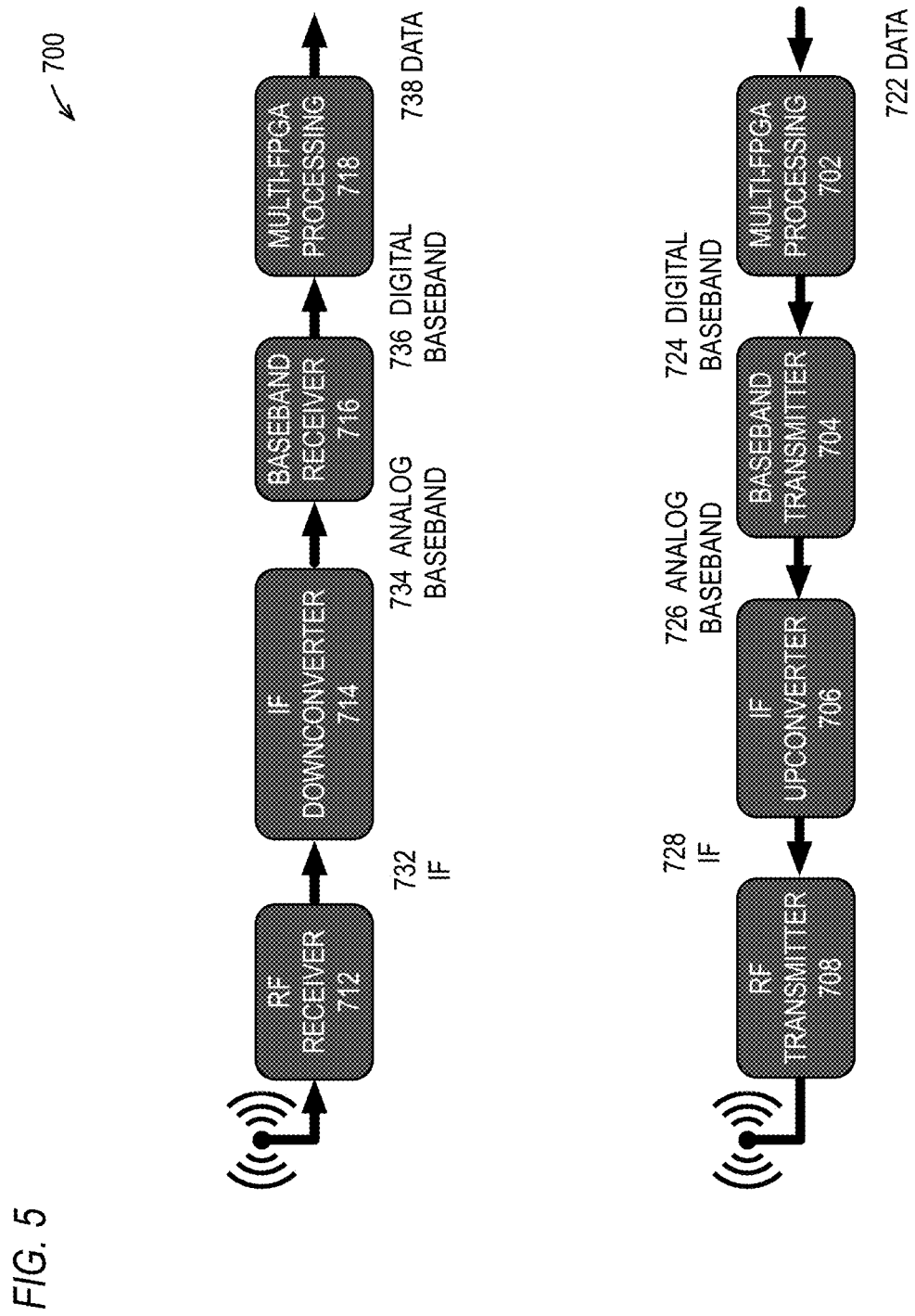
FIG. 5 is a block diagram of an example embodiment for a wireless communication system that can use the disclosed techniques.

FIG. 5 is a block diagram of an example embodiment for a communication system 700 that can transmit and receive OFDM symbols as described herein. The example embodiment of FIG. 5 includes a transmit path and a receive path. The transmit path includes multi-FPGA processing circuitry 702, a baseband transmitter 704, an IF upconverter 706, and an RF transmitter 708. The receive path includes an RF receiver 712, an IF downconverter 714, a baseband receiver 716, and multi-FGPA processing circuitry 718. The transmit path and the receive path that are communicating with each other can be located in different devices (e.g., base station and user equipment for cellular communications). If bi-directional communications are desired, the different devices can each include a transmit path and a receive path. Other variations can also be implemented.

Looking to the transmit path, transmit data 722 is sent to multiple FPGAs 702 that provide multi-FPGA processing of the transmit data 722. The transmit data 722 can be generated by other processing circuitry such as a control processor or other circuitry. These FPGAs 702 can operate at a selected clock rate (e.g., 192 MS/s (mega samples per second) or other rate) and can use efficient parallel wide data path implementations, for example, with multiple (e.g. 16) data elements (e.g., baseband samples) per wide data path sample. The FPGAs 702 output digital baseband signals 724 to the baseband transmitter 704. The baseband transmitter 704 includes a digital-to-analog converter (DAC) that converts the digital baseband samples to analog baseband signals 726. The baseband transmitter 704 including the DAC can operate at a selected sampling rate (e.g., 3.072 GS/s (Giga samples per second) or other rate) and can receive digital baseband samples from one or multiple FPGAs 702 within the multi-FPGA processing circuitry. The analog baseband signals 726 are received by an IF (intermediate frequency) upconverter 706 that mixes the analog baseband signals 726 to higher frequency IF signals 728. These IF signals 728 are received by the RF transmitter 708 which further upconverts these signals to the frequency range of the desired transmissions.

Looking to the receive path, the receiver 712 receives the RF transmissions from the RF transmitter which can be within a desired frequency range. The RF receiver 712 downconverts these RF transmissions to lower frequency IF signals 732. The IF signals 732 are then received by an IF downconverter 714 that mixes the IF signals 732 down to analog baseband signals 734. The analog baseband signals 723 are then received by a baseband receiver 716. The baseband receiver 716 includes an analog-to-digital converter (ADC) that converts the analog baseband signals 734 to digital baseband signals 736. The baseband receiver 716 including the ADC can operate at a sampling rate (e.g., 3.072 GS/s (Giga samples per second) or other rate) and can send digital baseband samples 736 to one or multiple FPGAs within the multi-FPGA processing circuitry 718. The FPGAs 718 receive the digital baseband signals 736 and generate digital data that can be processed by additional processing circuitry such as a control processor or other circuitry. These FPGAs 718 can operate at a selected rate (e.g., 192 MS/s (mega samples per second) or other rate using efficient parallel wide data path implementations, for example, with multiple (e.g., 16) data elements (e.g., baseband samples) per wide data path sample.

The disclosed embodiments can also be used for OFDM-based transmission schemes for massive MIMO cellular telecommunication systems as described in U.S. Published Patent Application 2015/0326291, entitled "SIGNALING AND FRAME STRUCTURE FOR MASSIVE MIMO CELLULAR TELECOMMUNICATION SYSTEMS," which is hereby incorporated by reference in its entirety. Such massive MIMO (multiple input, multiple output) communication systems can be used for 5G dynamic TDD (time division duplex) air interfaces. The 5G ($5^{th}$ generation) mobile telecommunications is able to span a wide variety of deployment scenarios (e.g., Rural, Urban Macro, Dense Urban, Indoor, etc.) in a flexible and scalable manner. In particular, massive MIMO reciprocity-based TDD air interfaces allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC).

The disclosed embodiments can also be used with techniques and related embodiments described in U.S. patent application Ser. No. 15/940,103, filed Mar. 29, 2018, and U.S. patent application Ser. No. 15/855,148, filed Dec. 27, 2017, each of which is hereby incorporated by reference in its entirety.

Figure 6:
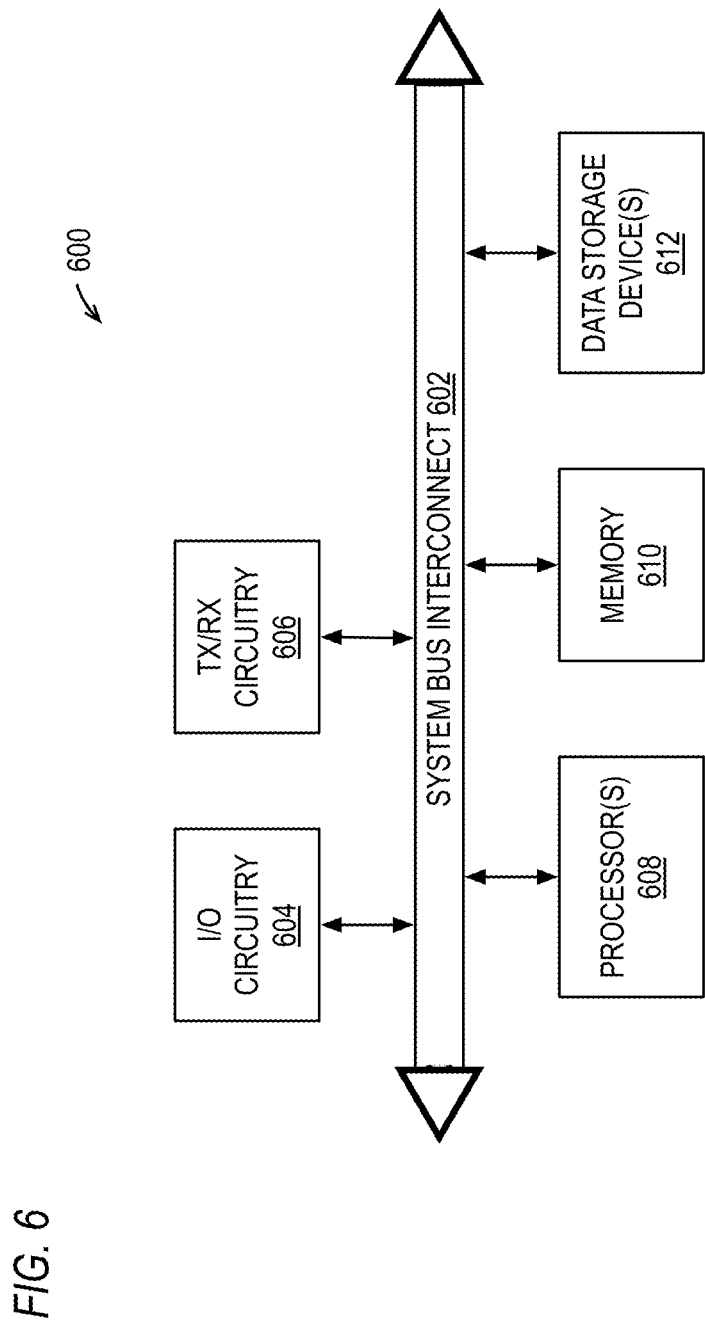
FIG. 6 is a diagram of an example embodiment for electronic components that can be used to implement a base station and/or user equipment (UE) for the disclosed embodiments.

FIG. 6 is a diagram of an example embodiment 600 for electronic components that can be used to implement a base station and/or user equipment (UE) including the functions and operational features described for the disclosed embodiments. For the example embodiment 600 shown in FIG. 6, one or more processors 608 communicate with other components through system bus interconnect 602. For example, the one or more processors 608 communicate with input/output (I/O) circuitry 604 and transmit/receive (TX/RX) circuitry 606 through the system bus interconnect 602. Additional circuitry can also be included such as power supply circuitry and/or other desired circuitry. The TX/RX circuitry 606 provides one or more cellular radios and are preferably coupled to a plurality of antennas through which the TX/RX circuitry transmits and receives RF (radio frequency) signals (e.g., from a few kHz to 10 GHz and above). The I/O circuitry 604 provides one or more interfaces for users, such as graphical user interfaces, and/or connections to peripheral devices (e.g., displays, keyboards, mice, point device, and/or other I/O peripheral devices). The memory 610 is also coupled to the system bus interconnect 602 and can be used by the one or more processors 608 to load and/or store instructions, data, and/or other information during operation. One or more data storage device(s) 612 are also connected to the system bus interconnect 602 and can store software or program instructions and/or other desired data or information for the operation of the processing system. For example, computer-readable instructions stored in the data storage devices 612 can be loaded within the memory 610 and then executed by the processor(s) 608 to carry out the functions described herein.

It is noted that different and/or additional components from those depicted in FIG. 6 could also be used to implement one or more radio systems for the embodiments described herein while still taking advantage of the techniques described herein. It is further noted that the system bus interconnect 602 can be implemented as multiple interconnection buses with our without additional intervening circuitry such as routing or switching circuitry. Further, the processor(s) 608 can be implemented using one or more programmable integrated circuits including controllers, microcontrollers, microprocessors, hardware accelerators, configurable logic devices (e.g., field programmable gate arrays), and/or other programmable integrated circuits that are programmed to carry out the function described herein. Further, the one or more processor(s) 608 can execute instructions stored in a non-transitory tangible computer-readable medium to perform the functions described herein. In addition, data storage device(s) 612 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory 610 can be any data storage medium configured to maintain data storage when powered. Other variations could also be implemented.

Terms

The following is a glossary of terms used in the present application:

A spatial stream is a sequence of symbols transmitted from an antenna port. The term spatial stream is used in the present disclosure in the context of spatial multiplexing. Spatial multiplexing is a transmission technique used in a MIMO (multiple input multiple output) wireless communication system in which multiple spatial streams are transmitted from the multiple transmit antenna ports of the MIMO system.

An antenna port is defined such that the physical channel over which a symbol on the antenna port is conveyed can be inferred from the physical channel over which another symbol on the same antenna port is conveyed. For example, an antenna port may convey a DMRS over a channel, and the antenna port may convey on the channel a corresponding spatial stream whose symbols are demodulated using the channel estimate obtained from the received DMRS. For another example, an antenna port may convey a PTRS over a channel, and the antenna port may convey on the channel a corresponding spatial stream whose symbols having phase noise tracked and compensated using the PTRS.

A symbol is a complex-valued signal transmitted over a space-time-frequency resource. Examples of OFDM symbols are DMRS, SRS (Sounding Reference Signal), data channel symbols and control channel symbols.

A physical channel is an uplink or downlink physical channel. A physical channel corresponds to a set of resource elements carrying information originating from the higher layers of a communication protocol stack. Examples of channels are PDSCH (physical downlink shared channel), PUSCH (physical uplink shared channel), PDCCH (physical downlink control channel), PUCCH (physical uplink control channel), and PBCH (physical broadcast channel).

A resource element is an element in an OFDM resource grid for an antenna port and subcarrier spacing configuration.

CPE (common phase error) is a common phase rotation across all of the subcarriers for an OFDM transmission.

Phase noise is partial random phase variation over time in a signal. Typically, phase noise is introduced by non-ideal sinusoidal signals generated by oscillators.

A DMRS is a demodulation reference signal which is used for channel estimation purposes in order to allow demodulation of one or more physical channels, e.g., PDSCH, PUSCH PDCCH, PUCCH, PBCH.

A DMRS port is an antenna port over which a DMRS is transmitted and can be used to receive the data symbols transmitted on the same antenna port.

A PTRS is a phase tracking reference signal which is used to track and compensate for the impact of phase noise. A PTRS is also referred to herein as a PNRS (phase noise reference signal). The described embodiments advantageously facilitate a reduction in the number of DMRS ports (and their corresponding spatial streams) upon which PTRS need be transmitted when CPE correlation between one or more spatial streams is detected. This is particularly advantageous because PTRS generally need to be transmitted densely in time. Generally speaking, relative to DMRS, for example, PTRS need to be transmitted relatively densely in time because phase noise tends to vary more frequently over time than the channel estimate obtained from the DMRS. Thus, for example, it may be sufficient for one DMRS to be sent per slot/TTI; whereas, typically multiple PTRS need to be sent per slot/TTI, often within each symbol thereof.

A PTRS port is an antenna port over which a PTRS is transmitted.

A CSI-RS is a channel state information reference signal which is used to calculate the channel state information.

A CSI-RS port is an antenna port over which a CSI-RS is transmitted.

One objective for the 5G air interfaces is to operate from below 1 GHz to 100 GHz carrier frequencies over a large variety of deployment scenarios in a single technical framework, for example, using OFDM (orthogonal frequency division multiplexing) modulation. For this objective, phase noise (PN) becomes a major impairment at carrier frequencies above 6 GHz. Phase noise introduces two kinds of impairment on OFDM-based systems; (1) common phase error (CPE) and (2) inter-carrier interference (ICI). CPE is a common phase rotation across all of the subcarriers for an OFDM transmission, and CPE manifests as a common rotation of the demodulated constellation. The phase noise at each subcarrier frequency also introduces ICI to the neighboring subcarriers, and this spectral leakage degrades the orthogonality of the OFDM waveform. This degradation is manifested as a "fuzziness" in each demodulated constellation point, and the level of ICI can be measured by the degradation of the EVM (Error Vector Magnitude) of the communication link. Phase noise typically increases with the carrier frequency, for example, one general assumption is that PSD (power spectrum density) associated with phase noise increases by about 20 dB per decade of frequency.

CPE can be estimated in a straightforward manner with a least squares estimator according to the equation shown below.

$$\hat{J}_0(m) = \frac{\sum_{k \in S_p} R_k(m) X_k^*(m) H_k^*(m)}{\sum_{k \in S_p} |X_k(m) H_k(m)|^2}.$$

For this equation, $R_k$ is the received subcarrier values; $X_k$, where $k \in S_p$, is the transmitted pilot symbol that is known at the receiver; $H_k$ is the channel estimate; and $S_p$ is the subset of the subcarriers occupied by the pilot. The CPE for each OFDM symbol within an OFDM transmission is the DC component of the DFT (discrete Fourier transform) of the baseband PN (Phase Noise) samples over that symbol duration.

As CPE is constant for all subcarriers within an OFDM symbol and can be estimated, CPE compensation can be performed with the introduction of Phase Noise Reference Signals (PNRS), also called Phase Tracking Reference Signals (PTRS), or other pilots within the OFDM transmissions. The addition of the PNRS/PTRS, therefore, allows for CPE compensation but only at the expense of additional pilot signal overhead within the OFDM symbols. This CPE estimation based on a static pilot pattern, therefore, has the drawback of high overhead due to required pilot signaling for the purely pilot aided PN compensation. Moreover, different devices and deployment scenarios have different levels of requirement for the PN (phase noise) mitigation. For example, UEs (user equipment) and base stations have significantly different phase noise PSD requirements, and UEs can be categorized into different groups with respect to PN performance based on their frequency band of operation and wireless system application, such as eMBB (enhanced Mobile BroadBand), URLLC (ultra-reliable low latency communications), mMTC (massive machine type communications), and/or other use cases.

It is noted that the terminology Phase Noise Reference Signal (PNRS) is used herein interchangeably with Phase Tracking Reference Signal (PTRS) to refer to the same signal. In addition to OFDM waveforms, PNRS/PTRS can also be inserted in SC (Single Carrier) waveforms in a straightforward manner to estimate and compensate the complete PN (Phase Noise) over that SC waveform. Examples of such single carrier waveforms include Single Carrier Frequency Division Multiple Access (SC-FDMA), DFT spread OFDM (DFT-s-OFDM), Null Cyclic Prefix Single Carrier (NCP-SC), etc.

PTRS (phase tracking—reference signal) ports and related signals can be used by base stations(s) to allow the UEs to derive a scalar estimation of the common phase error (CPE) due to the phase noise process which is assumed to be constant over all of the subcarriers of a given symbol of the allocated UE bandwidth. This estimate becomes more accurate with increasing the number of REs (resource elements) allocated to PTRS within the scheduled bandwidth of the given UE. In addition, when multiple antenna ports are used to transmit from the base station(s) to the UE, there can be one-to-one mapping or many-to-one mapping from the DMRS (demodulation reference signal) ports to the PTRS ports. The DMRS ports are used by the base station(s) to provide signals that facilitate demodulation operations within the UEs. While the use of PTRS ports and related communications can help improve CPE compensation, they can also lead to inefficiencies with respect to the use of available bandwidth and difficulties arise in the selection and allocation of the PTRS ports by the base station(s).

The disclosed embodiments provide techniques for UEs (user equipment) to measure CPE (common phase error) correlations among different receive (or transmit) spatial streams and then to provide feedback to base station(s) (e.g., gNB) with respect to these cross correlations. For one example embodiment, the feedback includes the results of the cross correlations such as a correlation matrix or a condensed/transformed version of it. For one other example embodiment, the feedback includes a selection by the UE of recommended PTRS ports to be associated with its DMRS ports, and this recommended port list is transmitted back to the base station(s). The base station(s) (e.g., gNB) then use this cross correlation feedback to select and configure the PTRS ports used for one or more UEs. Other variations can also be implemented while still taking advantage of the techniques described herein. The described techniques for selecting PTRS ports may improve the operation of wireless telecommunication systems by enabling them to improve CPE compensation and to more efficiently use available bandwidth.

Example Communication Environments for the Disclosed Embodiments

With respect to the descriptions provided herein, the following abbreviations are used:
PTRS: Phase Tracking Reference Signal
DMRS: Demodulation Reference Signal
TRP: Transmission Reception Point
gNB: g NodeB (base station)
PSD: Power Spectral Density
PN: Phase Noise
TTI: Transmission Time Interval, the minimum scheduling interval for a UE
Example Architectures of Base Station (BS) and User Equipment (UE)
The following are example architectures that can be used for base station (BS) and user equipment (UE) implementations within a wireless communication system. As these are example embodiments, it is understood that additional and/or different architectures could be used.
At the TRP the following are example architectures:
One antenna panel only
   One LO (local oscillator) shared between all antennas of the panel
   Multiple LOs shared between the antennas of the panel
      With common clock
Multiple antenna panels
   One LO shared between all antenna panels
   One LO per antenna panel
      With common clock shared between all LOs
      Separate clock for each/some of the LOs
   Multiple LOs per panel
      Common clock per panel
      One clock for all the LOs in that antenna panel
With Multiple TRP joint transmission of some category (Non Coherent Joint Transmission (NCJT), Dynamic Point Selection (DPS), Coordinated Multi-Point (CoMP), etc.), there are multiple TRPs and/or multiple gNBs that can communicate to an UE in a coordinated manner. In such cases, the example architecture can have:
Separate LO(s) per TRP, different clock(s) per TRP
Each of the sub options per TRP as given in previous list
At the UE the following are example architectures:
One antenna panel only
   One LO (local oscillator) shared between all antennas of the panel
Multiple antenna panels
   One LO shared between all antenna panels
   One LO per antenna panel
      With common clock shared between all LOs
      Separate clock for each/some of the LOs
In addition to antennas and panels, there are digital transceiver chains, which are mapped to the antennas/panels using an antenna mapping matrix. Additional and/or different circuitry and components can also be included while still taking advantage of the techniques disclosed herein.

FIGS. 7-9 provide example embodiments for different implementations where clock signals and related circuitry are used as LOs for RF channels within downlink (DL) and/or uplink (UL) circuitry for base stations or UEs. It is noted that the LO signals can be used, for example, to mix RF signals up to higher frequencies and/or to mix RF signals down to lower frequencies within the DL and/or UL circuitry for base stations or UEs.

FIG. 7 is a block diagram of an example embodiment where the same clock, which can be generated by oscillator (OSC) 206, and the same PLL (phase lock loop) 204, which can be a divide-by-N based PLL (xN), are used as a single LO to generate LO signals that are provided to multiple different RF channels ($RF_1 \ldots RF_X$) 202.

FIG. 8 is a block diagram of an example embodiment where the same clock, which can be generated by oscillator (OSC) 206, is used as an input to multiple different PLLs ($PLL_1 \ldots PLL_Z$) 204, which can each be a divide-by-N based PLL (xN). These different PLLs 204 in combination with the clock are used as different LOs to generate multiple LO signals that are provided to multiple sets of different RF channels ($RF_1 \ldots RF_X, RF_1 \ldots RF_Y$) 202.

FIG. 9 is a block diagram of an example embodiment where multiple clocks, which can be generated by multiple oscillators ($OSC_1 \ldots OSC_Z$) 206, are used as inputs to multiple different PLLs ($PLL_1 \ldots PLL_Z$) 204, which can each be a divide-by-N based PLL (xN). These different PLLs 204 in combination with the different clocks are used as different LOs to generate multiple LO signals that are provided to multiple sets of different RF channels ($RF_1 \ldots RF_X, RF_1 \ldots RF_Y$) 202.

As explained in further detail below, depending on the architecture implemented for the base stations and/or UEs, the Phase Noise (PN) characteristics are different. Further, the downlink (DL) parts and the uplink (UL) parts of the implementations can also have different PN characteristics and should therefore be considered separately.

Example of Different Varieties of MIMO Transmissions

A base station (BS) for a MIMO communication system will set up multiple spatial streams. The following are examples of communication systems with such multiple spatial streams:
SU-MIMO (Single User—MIMO)
   Single TRP
   Multi TRP
MU-MIMO (Multi-User MIMO)
   Single TRP
   Multi TRP
For each of these spatial stream examples, the UE communicating with the base station can be implemented as a SISO (single input, single output) device or as a MIMO device.
Also for MIMO systems, there is a mapping between the spatial streams and the transceiver architectures. To simplify the discussions below, the following assumptions are applied, although it is understood that the techniques described herein can be applied to other combinations in straight forward manner.
SS stands for Spatial Stream; TRX stands for Transceiver chain
Mapping of SS to Antennas
   One SS is mapped within one antenna panel (e.g., the SS is not shared between the antennas on two or more panels)
   OR One SS is mapped to multiple antenna panels
   More than one SS can be mapped to one antenna panel
One SS transmission involves only one LO
   Within a TRP, the SS are mapped to TRX such that each SS has only one LO
Multiple SS can share an LO
While the current NR definition supports up to 12 SS, there are discussions to extend it to 16 SS (e.g., by supporting 16 orthogonal DMRS ports). The techniques described herein can be scaled up to 16 SS but are not limited to 16 SS. The disclosed techniques can be used for systems with more than 16 SS as well.

Characteristics of Phase Noise

To describe the phase noise in the system:

Total phase noise PSD is the combination of the PSD at TX and PSD at RX.

Usually UE will have a lot worse PSD than TRP due to the relative difference in quality of RF chains at UE and TRP.

The UEs in the network will be categorized into UE categories depending on this RF quality and other transmission capabilities of that UE. That UE category and/or UE capability and/or UE feature is expected to reflect the PSD quality to some level.

In an OFDM system, the Phase Noise impact is measured on a per symbol level via:

CPE (Common Phase Error)

ICI (Inter Carrier Interference)

The PSD of Phase Noise is a combination of:

PSD of PN of Clock

PSD of PN of PLL Loop Filter

PSD outside the Loop Filter BW

Now, to compensate the PN for OFDM at less than 40 GHz, estimating and compensating for CPE is sufficient. CPE is different for each symbol, and is a random variable in time, following a type of random walk process. The 40 GHz upper bound is an example of current RF technology; however, it should be understood that the upper bound will likely shift in the future as RF technology progresses.

Measurement of the Phase Noise between Spatial Streams

Descriptors of Phase Noise Correlation

Depending on the clocks and LOs involved and their mapping to the antenna elements, the Phase Noise process of different SS can be correlated to different degrees. As such, the following are characterized:

Dependence of the complete phase noise between SS

Dependence of the CPE between SS

With respect to dependence of the phase noise between SS, it is desirable to estimate exact PN samples over time/SC (subcarrier) per SS and then find the cross correlation between the SS of this complete PN process. These will include the impact of CPE and ICI.

With respect to dependence of the CPE between SS, there are a number of options to characterize it as provided below. First, CPE is found for a symbol for each SS. Then, the following options can be performed:

Compare the instantaneous CPE per SS in that symbol:

If all SS are completely correlated, then this CPE should be the same.

If there is partial correlation among some SS, but not the others, then the CPE of those SS should be similar while that of the uncorrelated SS will be different.

Compare the time series of instantaneous CPE per SS over multiple symbols in the TTI:

There are multiple ways to find the CPE in a symbol per SS.

If the CPE is estimated over N symbols out of M in the TTI, then the time series of CPE is obtained per SS.

The cross correlation of the CPE over all or some of the SS can then be calculated.

Compare over multiple TTIs:

Knowledge from past TTIs in which the UE has been scheduled can be used to get more sample points for estimating the CPE.

Methods to Estimate the CPE

It is proposed to use a toolkit of methods to estimate the CPE depending on the symbol number and structure. They are introduced here with more details being provided below.

DMRS (demodulation—reference signal) based

Use the DMRS which is either front loaded or also can be in middle of the slot

PTRS based

Use the PTRS in the PDSCH (physical downlink shared channel)

CSI-RS (channel state information—reference signal) based

The CSI-RS can be used, present again in PDSCH

Blind data based

The blind data based methods can be used in symbols.

Depending on the numerology and frame structure, each symbol in the TTI can support all or some of the above methods. Using all or some of the methods listed above, one can estimate the CPE time series in a TTI. Then, using one of the CPE cross correlation methods listed above, one can estimate to what degree the phase noise between the SS is correlated.

Figure 10:
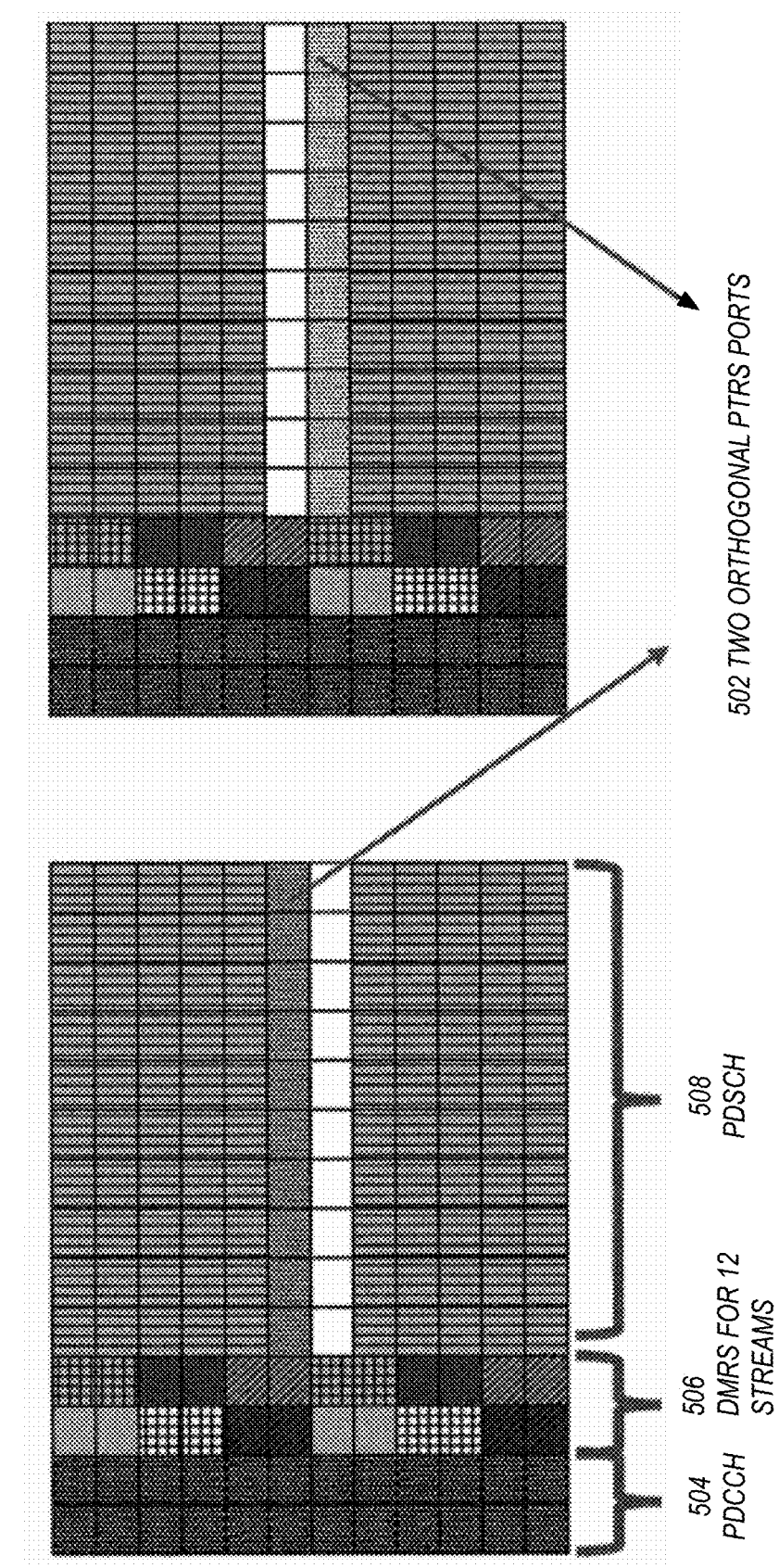
FIG. 10 is a diagram that provides an example diagram of two frames transmitted from a MIMO base station that include two orthogonal PTRS ports with the PDSCH.

FIG. 10 provides an example diagram of two subframes 500 transmitted from a MIMO base station that include two orthogonal PTRS ports 502 with the PDSCH 508. The PDCCH (physical downlink control channel) 504 symbols are included at the beginning of each frame followed by DMRS (demodulation reference signal) symbols 506 for 12 spatial streams.

Feedback of the Correlation of PN Between SS

The following methods are proposed to feedback the correlation from the UE to the base station. The base station can then use this feedback to allocate PTRS ports to UEs.

Feedback Method Type 1:

Send back the raw or quantized version of the cross correlation matrix. The matrix looks like the matrix below:

$SS\_xcorr = [C\_1\_1, C\_1\_2, \ldots, C\_1\_N; C\_2\_1, C\_2\_2,$ $C\_2\_3, \ldots, C\_2\_N; \ldots; \ldots; C\_N\_1, C\_N\_2, \ldots, C\_N\_N]$ $$SS_{xcorr} = \begin{bmatrix} C_{11} & \cdots & C_{1N} \\ \vdots & \ddots & \vdots \\ C_{N1} & & C_{NN} \end{bmatrix}$$

It is noted that not all values may typically be estimated by a specific UE. It depends on the number of DMRS that a UE can receive. The UE can be configured to send feedback for cross correlation back to the gNB over a UCI (Uplink scheduling Control Information) message, a MAC CE (Media Access Control—Control Element), a RRC (Radio Resource Control) message, and/or some other desired message channel.

Example

If a TRP transmits SS 1,2,3,4,5,6 in one DMRS group (which are usually Quasi Co-Located (QCLed)) and 6 other SS in a second DMRS group; and if UE1 is configured to receive data addressed to it in spatial streams 1,2,3,4 out of the 12 SS transmitted by that TRP; and if UE1 can also receive the other DMRS in the group, i.e. corresponding to SS 5 and 6; then the UE1 can use the DMRS to equalize 6 out of the 12 spatial streams (i.e., SS 1,2,3,4,5,6) even though only 4 contain data addressed to it. And UE1 can fill in a 6×6 cross correlation matrix.

After this matrix is prepared, it can be signaled back by the UE in a number of ways.

- Feedback all elements of the matrix: [C_1_1, C_1_2, . . . , C_1_N, C_2_1, C_2_2, C_2_3, . . . , C_2_N, . . . , C_N_1, C_N_2, . . . , C_N_N];
- Feedback only the off-diagonal terms of the matrix: [C_1_2, C_1_3, . . . , C_1_N, C_2_1, C_2_3, . . . , C_2_N, . . . , C_N_1, C_N_2, . . . , C_N_N_N−1];
- Feedback the averaged cross correlation per pair of Spatial Streams;
  - combine C_1_2 and C_2_1 into Ceff_2=(C_12+C_2_1)/2
  - send back [Ceff_1_2, Ceff_1_3, Ceff_1_4, . . . , Ceff_1_N, Ceff_2_3, Ceff2_4, . . . , Ceff_2_N, Ceff_3_4, . . . , Ceff_3_N, . . . Ceff_N−1_N]
- Feedback only those cross-correlation values which are above/below a certain threshold;
- Feedback only those cross-correlation values which are above/below a certain SS-specific threshold;
- Feedback quantized (e.g., linear or logarithmic) cross-correlation values, for example the cross-correlation value has to be mapped to a two-digit binary number; and/or
- Consider all the options mentioned above but feedback only those values that differ from the previous reporting.
- It is further noted that additional and/or different feedback techniques could also be used by the UE to send cross correlation feedback information back to the TRP, such as a base station.
- Feedback Method Type 2:

In this method, the concept is to send back to the TRP the UE's suggestion for allocating the PTRS ports to it. The UE selects the optimum number of PTRS ports it needs and which DMRS ports with which they are associated using the cross correlation matrix it has computed. The raw cross correlation data is not sent back. Instead, the UE recommendation for the PTRS ports it needs is sent back. It is up to the base station scheduler to take into consideration such feedback from all relevant scheduled UEs and allocate the actual number of PTRS ports and map them to the DMRS ports and spatial streams. The feedback can be configured to be sent back to the gNB over a UCI message, a MAC CE, a RRC command, and/or some other desired message channel.

Example

Continuing the example from the feedback Type 1 above, the UE measures the 6×6 cross correlation matrix, and in this instance finds that the phase noise process on spatial streams 1 and 2 are highly correlated, and that those on spatial streams 3, 4, 5, 6 are highly uncorrelated. In that case, it may request the TRP to allocate five spatial streams and to map PTRS port 1 to DMRS port 1, to map no PTRS ports to DMRS port 2, and to map PTRS ports 2 through 5 to DMRS ports 3 through 6, respectively. It is noted that DMRS port 5 and 6 are used for another UE for this example.

Example Flow Diagrams

Figure 11A:
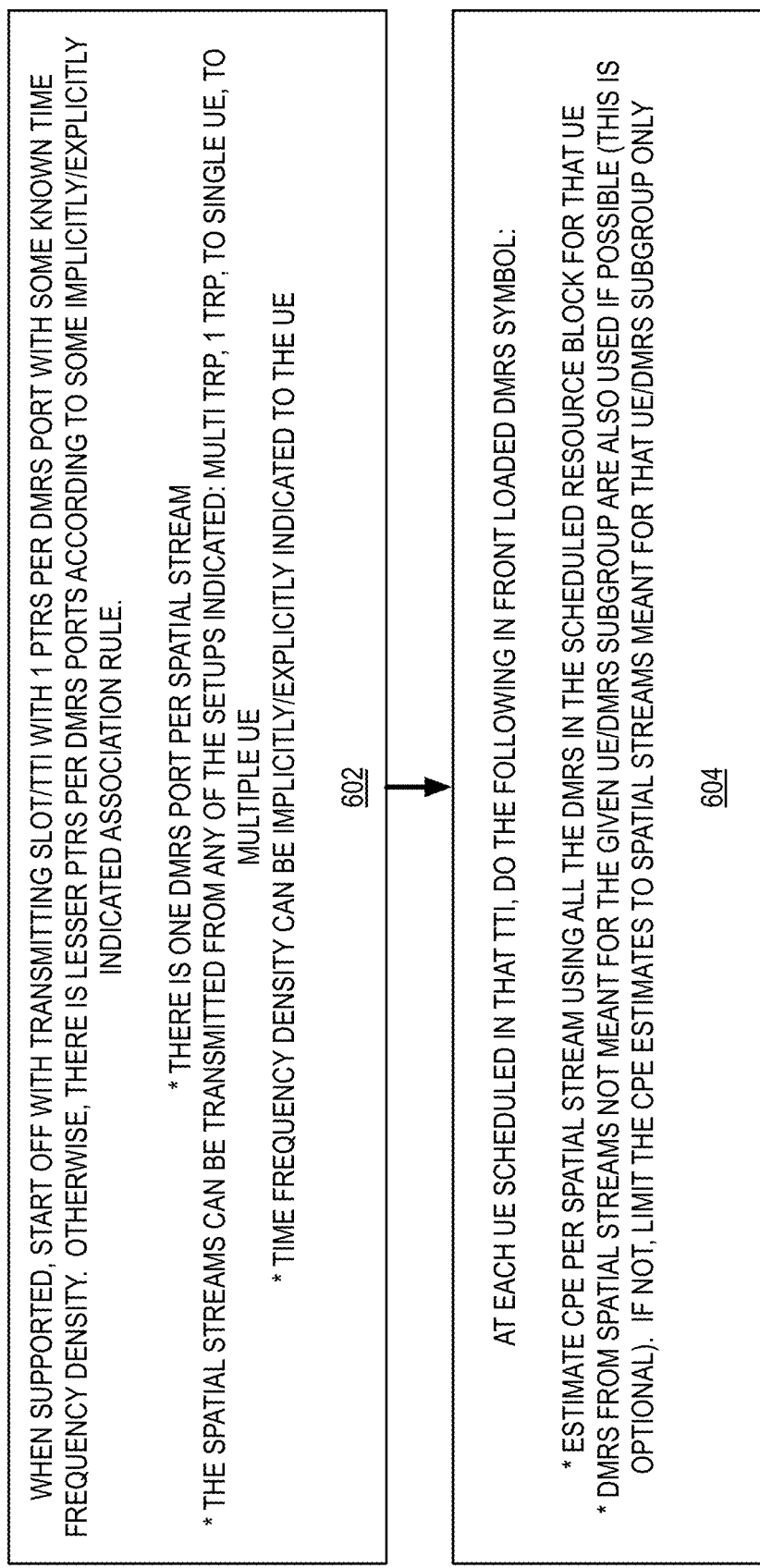
Figure 11C:
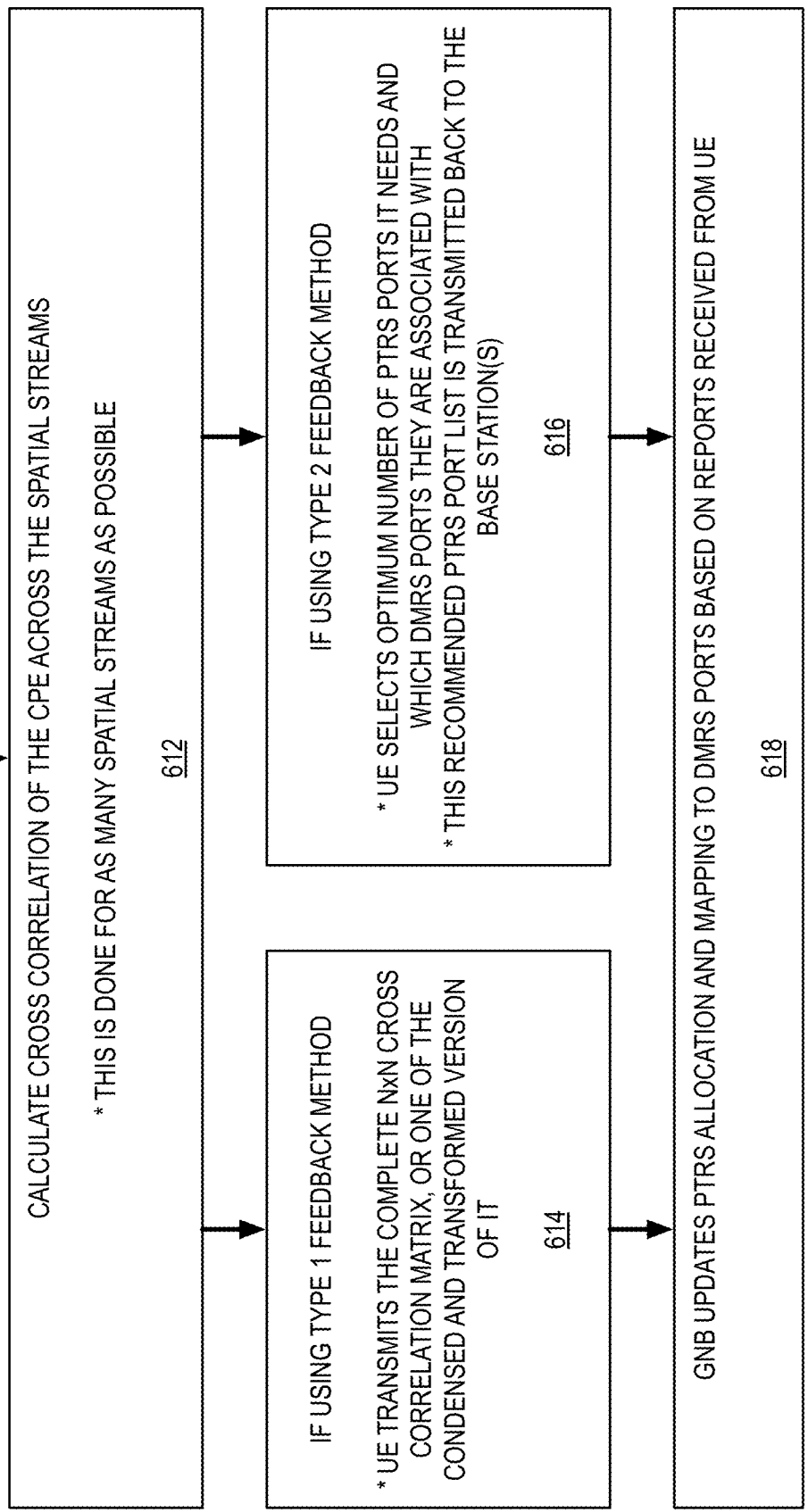

FIGS. 11A-C provide an example flow diagram for performing the PN correlation at the UEs and for the feedback of these correlations from the UE to the base station. It is noted that although the discussions herein focus on the DL, these methods can be extended to UL in a similar manner.

Looking first to FIG. 11A, at block 602, when PTRS communications are supported by the base station, the process starts off with transmitting Slot/TTI with 1 PTRS per DMRS port with some known time frequency density. Otherwise, there is lesser PTRS per DMRS ports according to some implicitly/explicitly indicated association rule. Further:

- There is one DMRS port per spatial stream;
- The spatial streams can be transmitted from any of the setups indicated: Multi TRP, One TRP, to single UE, to multiple UEs; and
- Time frequency density/location can be implicitly/explicitly indicated to the UE.

Next, at block 604, at each UE scheduled in that TTI, the following are done in the front loaded DMRS symbol:

- Estimate CPE per Spatial Stream using all the DMRS in the scheduled resource blocks for that UE; and
- DMRS from spatial streams not meant for the given UE group or DMRS group are also used if possible (this is optional). If not, limit the CPE estimation to SS meant for that UE group or DMRS group only Next, at block 606, at each UE scheduled in that TTI, the following are done in the symbols that have PTRS (special case is if every PDSCH symbol has a PTRS):

- Estimate CPE per Spatial Stream using all the PTRS in the scheduled resource blocks for that UE; and
- PTRS from spatial streams not meant for the given UE are also used if possible (this is optional). If not, limit the CPE estimation to use PTRS in SS meant for that UE only.

Next, at block 608, at each UE scheduled in that TTI, if additional (non-front loaded) DMRS symbol present, the following are done:

- Estimate CPE per Spatial Stream using all the DMRS in the scheduled resource blocks for that UE; and
- DMRS from spatial streams not meant for the given UE group or DMRS group are also used if possible (this is optional). If not, limit the CPE estimates to SS meant for that UE group or DMRS group only Next, at block 609, if some of the symbols in the TTI contain a CSI-RS transmission, the UE can use the CSI-RS to derive the CPE if sufficient number of CSI-RS are available to achieve reliable CPE estimation.

Next, at block 611, at each UE scheduled in that TTI, if a selected PDSCH symbol has no DMRS or PTRS or CSI-RS, then estimate the CPE with blind method. This is done only in SS meant for that UE.

Next, at block 612, the cross correlation of the CPE is calculated across the spatial streams. This is done for as many SS as possible.

If the Type 1 Feedback method is being used, at block 614, the UE then transmits the complete N×N Cross Correlation matrix, or one of the condensed and transformed version of it, back to the base station.

If the Type 2 Feedback method is being used, at block 616, the UE then selects the optimum number of PTRS ports it needs and which DMRS ports with which they are associated. This recommended PTRS port list is transmitted back to the base station(s) by the UE.

Finally, at block 618, the base stations (e.g., gNB) updates PTRS allocation and mapping to DMRS ports based on reports received from UEs.

Extension Modification for Multi TTI Operation

The following provides an extension of the example flow provided in FIGS. 11A-C for OFDM to multiple TTIs. The proposed method uses the CPE estimates from the last M number of TTIs for which a specific UE was scheduled with a similar transmission mode setup.

The proposed method for each TTI-i is as follows:
If the UE is scheduled with Transmission scheme setup Y:
  Estimate CPE in each possible symbol of the TTI as provided in the example of FIGS. 11A-C; and
  Obtain Time Series of CPE per symbol per spatial stream.
If previous TTI(s) that used same Transmission scheme Y were present:
  Concatenate the CPE Estimates of Current TTI-i with the past TTI(s) and update the Cross Correlation Matrix (SS_xcorr);
  OR
  Find SS_xcorr per individual TTI and combine them with either averaging or a variety of exponentially weighted averaging to get a new update of SS_xcorr.
Send back the updated SS_xcorr or the recommended PTRS port configuration settings back to the gNB depending on the Feedback Method Type 1 or 2 used.
Wait for next TTI when the UE is scheduled.
Extension Modification for Single Carrier Modulations For the case of single carrier waveforms [SC=Single Carrier Transmission Scheme], such as Null CP Single Carrier Waveform, or SC-FDMA or any of the other candidates in the single carrier family, the problem of phase noise estimation and compensation still exists. However, the OFDM type Common Phase Error (CPE) is not relevant as the phase noise does not need to be compensated in frequency (per subcarrier) and instead needs to be compensated in time.

Some techniques for such PN time compensation are:
Time domain Pilot aided compensation;
Time domain Cyclic Prefix aided compensation; and
Time domain blind compensation.

In addition, the proposed techniques described herein can be extended to such single carrier scenario. For example, consider a MU-MIMO type SC system where multiple UEs are scheduled on the same time frequency resource. Each UE gets a UE specific pilot that is pre-coded in the same manner as the data to the UE. This is called the SC DMRS pilot. There are additional SC PTRS pilots that can be used in the system. Each SC PTRS is associated to one or more SC DMRS port and share the same precoding as exactly one SC DMRS port. The algorithm can then be implemented the same as in FIGS. 11A-C above for the OFDM case but PTRS is replaced by SC PTRS and DMRS is replaced by SC DMRS.

As noted above, although the discussions herein focus on the DL, these methods can be extended to UL in a similar manner.

It is noted that the disclosed embodiments can be used with respect to a variety of OFDM-based transmission schemes for RF communication systems. It is also noted that as used herein, a "radio frequency" or RF communications means an electrical and/or electro-magnetic signal conveying useful information and having a frequency from about 3 kilohertz (kHz) to thousands of gigahertz (GHz) regardless of the medium through which such signal is conveyed. The OFDM-based transmissions may be transmitted through a variety of mediums (e.g., air, free space, coaxial cable, optical fibers, copper wire, metal layers, and/or other RF transmission mediums). As one example, the disclosed embodiments could be used for millimeter (mm) wave transmissions between 30-300 GHz having wavelengths of 1-10 mm (e.g., a transmission range of 71-76 GHz) if OFDM-based modulation were used for the mm wave transmissions. In addition, the disclosed embodiments will likely be useful for 5G solutions up to 40 GHz where OFDM-based modulations are more likely to be implemented. For example, 5G frequency ranges and bands around 28 GHz, 39 GHz, and/or other frequency ranges or bands where OFDM-based modulation is used for RF transmissions will benefit from the disclosed techniques. It is further noted that example wireless communication systems within which the disclosed techniques can be applied are also described in U.S. Published Patent Application No. 2015-0303936 (Ser. No. 14/257,944) and U.S. Published Patent Application No. 2015-0305029 (Ser. No. 14/691,339), each of which is hereby incorporated by reference in its entirety.

Figure 12:
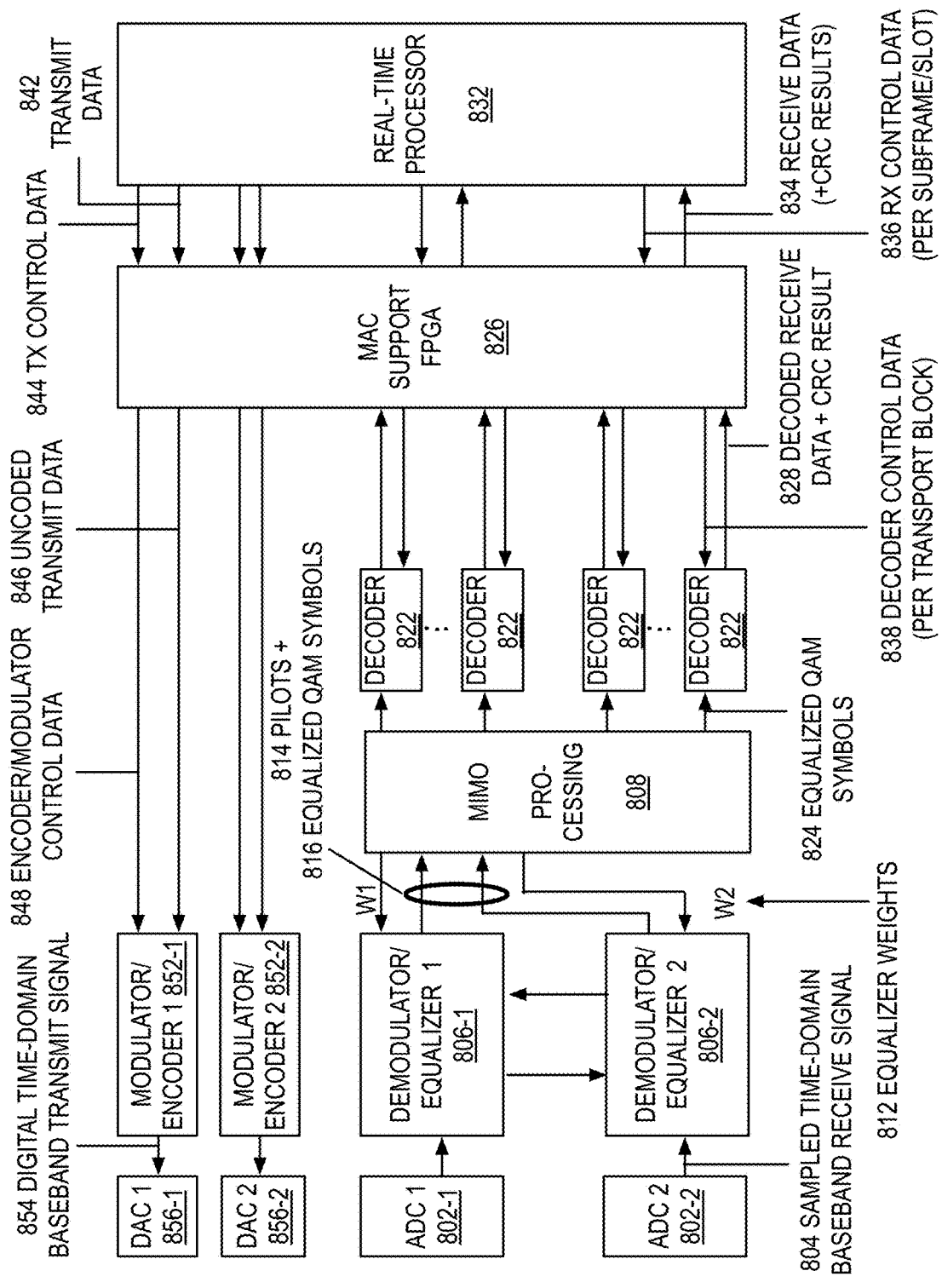
FIG. 12 is a block diagram of an example embodiment for circuitry that can be used to provide a baseband receiver, a baseband transmitter, multi-FPGA processing circuitry, and a real-time processor with respect to the embodiment of FIG. 5.

FIG. 12 is a block diagram of an example embodiment for circuitry that can be used to provide a baseband receiver, a baseband transmitter, multi-FPGA processing circuitry, and a real-time processor with respect to the embodiment of FIG. 5. The embodiment of FIG. 12 provides two receive/transmit streams and related processing circuitry.

Looking to the embodiment of FIG. 12, two analog-to-digital converters (ADC1 802-1, ADC2 802-2) receive analog baseband signals and output sampled digital baseband signals 804 (i.e., sampled time-domain baseband receive signals) to two demodulators/equalizers 806. The demodulators/equalizers (DEMODULATOR/EQUALIZER 1 806-1, DEMODULATOR/EQUALIZER 2 806-2) demodulate and equalize the respective receive signals. Due to the complexity of the MIMO (multiple input multiple output) equalization task, some parts of the related functionality are realized by a separate MIMO processing circuitry (MIMO PROCESSING 808). Specifically, this MIMO processing circuitry 808 performs the MIMO channel estimation and the calculation of the equalizer weights 812. For this, it uses the (pre-processed) pilot signals/symbols 814 extracted from both received baseband signals as input. These (pre-processed) pilot signals 814 are provided by the demodulators/equalizers 806. The equalizer weights 812 (W1, W2) calculated by the MIMO processing circuitry 808 are fed back to the demodulators/equalizers 806, which can perform the final MIMO equalization using these equalizer weights 812. To support this final MIMO equalization task, the demodulators/equalizers 806 can exchange intermediate equalization results. The final output of the demodulators/equalizers 806 are equalized QAM (quadrature amplitude modulation) symbols 816 for both receive streams. These equalized QAM symbols 816 are provided to the MIMO processing circuitry 808, which can distribute the equalized QAM symbols 824 to multiple decoders (DECODER 822). It is noted that the upper set of decoders 822 can be used for decoding the first receive stream and the lower set of decoders 822 can be used for decoding the second stream. The decoders 822 output decoded digital receive data 828 plus CRC (cyclic redundancy check) results per transport block to the MAC support FPGA 826. The MAC support FPGA 826 can collect the output data 828 of all decoders 822, can further process them, and can provide them to the real-time processor (REAL-TIME PROCESSOR 832) in a synchronized and consistent manner. The real-time processor 832 can perform further operations on the received data 828 (and CRC results) provided by the MAC support FPGA 826. Further, it can provide receiver (RX) control information 836 to the MAC support FPGA 826 and/or other receiver FPGAs (not shown) to control and configure the respective receivers. For example, the real-time controller 832 can provide the control data 836 for all decoders 822 per subframe to the MAC support FPGA 826, and the MAC support FPGA 826 can distribute these control data 838 to each decoder 822 to provide the configuration used to decode the related transport block. A similar functionality can be provided by the real-time processor 832 for the transmit paths. Uncoded digital transmit data 842 and related transmitter (TX) control data 844 are sent from the real-time processor 832 to the MAC support FPGA 826, which distributes the digital transmit data 846 as well as the respective encoder/modulator control data 848 to the two modulators/encoders (MODULATOR/ENCODER 1 852-1, MODULATOR/ENCODER 2 852-2). The modulators/encoders 852 encode the transmit data 846 and perform the transmit modulation, e.g., generate the digital time-domain baseband transmit signals 854. These digital time-domain baseband transmit signals 854 are sent by the modulators/encoders 852 to the digital-to-analog converters (DAC1 856-1, DAC2 856-2). The DACs 856 receive the digital baseband signals 854 and output analog baseband signals. It is noted that demodulators/equalizers, modulators/encoders, MIMO processing circuitry, and decoders can be implemented using multiple parallel FPGAs.

The disclosed embodiments can also be used for OFDM-based transmission schemes for massive MIMO cellular telecommunication systems as described in U.S. Published Patent Application 2015/0326291, entitled "SIGNALING AND FRAME STRUCTURE FOR MASSIVE MIMO CELLULAR TELECOMMUNICATION SYSTEMS," which is hereby incorporated by reference in its entirety. Such massive MIMO (multiple input, multiple output) communication systems can be used for 5G dynamic TDD (time division duplex) air interfaces. The 5G ($5^{th}$ generation) mobile telecommunications is able to span a wide variety of deployment scenarios (e.g., Rural, Urban Macro, Dense Urban, Indoor, etc.) in a flexible and scalable manner. In particular, massive MIMO reciprocity-based TDD air interfaces allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC).

Figure 13:
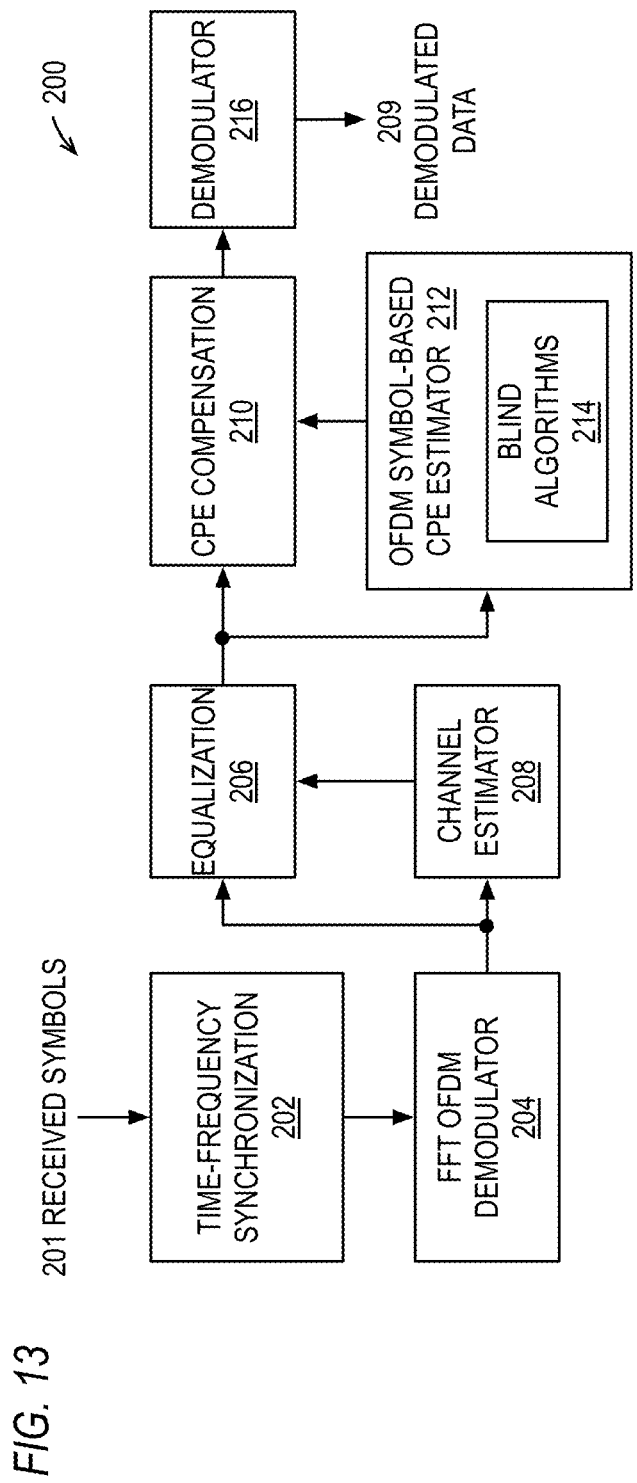
FIG. 13 is a block diagram of an example embodiment for symbol processing for OFDM transmissions including blind CPE estimation for CPE compensation.
Figure 14:
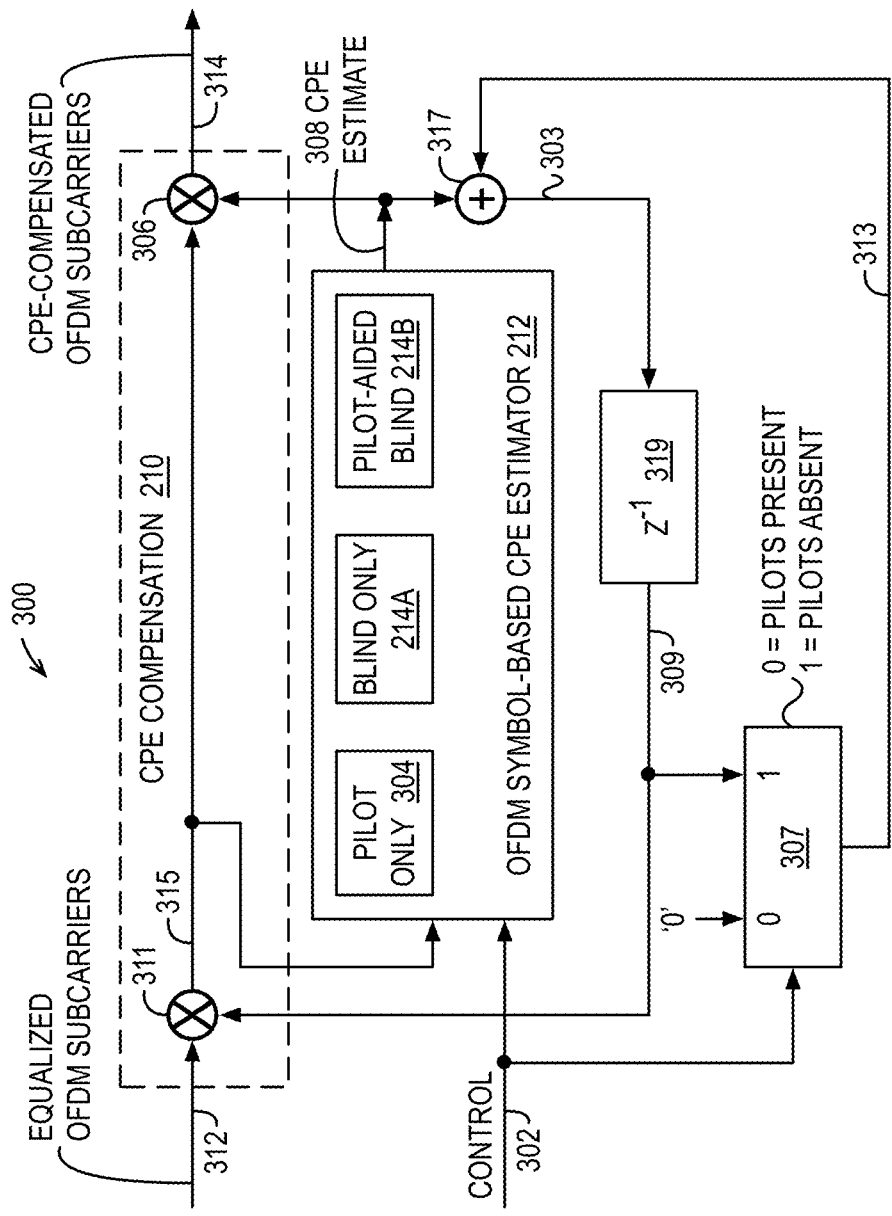
FIG. 14 is a block diagram of an example embodiment where the CPE estimator includes multiple estimation algorithms including a pilot only CPE estimation algorithm, a blind only CPE estimation algorithm, and a pilot aided blind CPE estimation algorithm.

The disclosed embodiments can also be used with CPE compensation techniques and related embodiments described in FIGS. 13 through 14 and in U.S. patent application Ser. No. 15/855,148, filed Dec. 27, 2017, which claims priority to U.S. Provisional Patent Application Ser. No. 62/443,226, entitled "BLIND COMMON PHASE ERROR (CPE) COMPENSATION FOR OFDM SYMBOLS IN WIRELESS COMMUNICATION SYSTEMS," each of which is hereby incorporated by reference in its entirety.

Looking now to FIG. 13, a block diagram is provided of an example embodiment 200 for symbol processing for OFDM transmissions. A time-frequency synchronization processor 202 receives incoming symbols 201 from OFDM transmissions and aligns the start of each OFDM symbol 201 for the FFT (fast Fourier transform) operations. The FFT OFDM demodulator 204 receives the output of the time-frequency synchronization processor 202 and demodulates the OFDM symbol to extract subcarriers using an FFT operation. The channel estimator 208 receives the subcarriers and uses pilot information within the subcarriers to generate an estimate of the channel response. The equalization processor 206 receives the channel estimate from the channel estimator 208 and applies it to the extracted subcarriers from the OFDM demodulator 204 to generate equalized OFDM subcarriers. The CPE estimator 212 receives the equalized OFDM subcarriers and applies one or more blind algorithms 214 (e.g., pilot-aided blind method, blind-only method) to generate a CPE estimate, although pilot only estimation can also be applied. The CPE compensation processor 210 then receives the CPE estimate from the CPE estimator 212 and applies it to the equalized OFDM subcarriers to compensate for the CPE. The compensated OFDM subcarriers are then demodulated by the demodulator 216 to generate demodulated data 209. For example, this demodulation can produce a decision regarding which constellation point was transmitted within a modulation scheme (e.g., 16 QAM) applied to the transmitted symbols for processing.

FIG. 14 is a block diagram of an example embodiment 300 where the CPE estimator 212 includes multiple estimation algorithms including a pilot only CPE estimation algorithm 304, a blind only CPE estimation algorithm 214A, and a pilot aided blind CPE estimation algorithm 214B. The CPE estimator 212 receives a control signal 302 that determines which CPE estimation algorithm is applied to any particular OFDM symbol. This control signal 302, for example, can be generated by one or more control processors. For the embodiment, the CPE compensator 210 includes a digital mixer 306 that mixes the CPE estimate 308 from the CPE estimator 212 with a compensated, or de-rotated, version 315 of the equalized OFDM subcarriers 312 to generate the CPE compensated OFDM subcarriers 314. The CPE estimate 308 is provided to an accumulator 317 that accumulates the CPE estimate 308 with the output 313 of a selector 307 to produce an accumulated CPE estimate 303, which is provided to a delay block 319 that delays the accumulated CPE estimate 303 by one OFDM symbol. Thus, the delay block 319 produces an accumulated CPE estimate 309 associated with the previous OFDM symbol, whereas the accumulator 317 produces an accumulated CPE estimate 303 associated with the current OFDM symbol. The delayed accumulated CPE estimate 309 is provided to an input of the selector 307 and a zero value is provided to the other input of the selector 307. The control signal 302 controls the selector 307 to select the delayed CPE estimate 309 when the current OFDM symbol is absent pilot symbols for estimating CPE and selects the zero input when pilot symbols for estimating CPE are present, or embedded, in the current OFDM symbol, as well as when the system is at rest and in response to the receiver transitioning to the blind-only method 214A from the pilot-only method 304 or pilot-aided method 214B. The delayed accumulated CPE estimate 309 is also provided to a second mixer 311 that mixes the equalized subcarriers 312 of the current OFDM symbol to generate the compensated version 315 of the equalized OFDM subcarriers 312. The compensated version 315 of the equalized OFDM subcarriers 312 are also provided to the CPE estimator 212, which uses them to compute the CPE estimate 308. Preferably, the digital mixer 306 forms a unitary amplitude complex value having a phase, or offset angle, that is a negated version of the CPE estimate 308 and multiplies the compensated version of the equalized OFDM subcarriers 315 by the formed complex value to generate the CPE compensated OFDM subcarriers 314. Similarly, the second mixer 311 forms a unitary amplitude complex value having a phase, or offset angle, that is a negated version of the delayed accumulated CPE estimate 309 and multiplies the equalized OFDM subcarriers 312 by the formed complex value to generate the compensated version 315 of the equalized OFDM subcarriers 312. As described above, the CPE estimator 212 uses the de-rotated/compensated equalized subcarriers 315 to generate the CPE estimate 308. For example, in the case of an N-subcarrier FFT, the CPE estimator 212 uses N subcarriers to generate the CPE estimate 308, and the mixer 306 applies the CPE estimate 308 to the N subcarriers. It is noted that in the case of an OFDM symbol embedded with pilot symbols that are used to compute the CPE estimate 308, the mixer 311 will not modify the equalized OFDM subcarriers 312 (i.e., will mix them with a unitary value by operation of the selector 307 to output a zero-valued phase, or angle, that, as the exponent of the formed complex value, will cause it to be unitary).

It is noted that the methods and related systems are provided that adapt the density of the PN reference signals or pilots within the OFDM transmissions in a dynamic and/or semi-static manner based on the performance of the purely pilot aided CPE compensation method 304, blind CPE compensation method 214A, and/or the pilot aided blind CPE compensation method 214B. This density of PN reference signals or pilots can be adapted in time and/or frequency. In addition, a receiving device (e.g., one or more UEs) can send control messages back to a transmitting device (e.g., one or more base stations) indicating the performance level associated with the CPE compensation methods being employed. For example, the number of symbols within a duration including PN reference signals or pilots can be reduced by the transmitting device as long as the pilot aided CPE compensation method continues to provide adequate performance. Once all PN reference signals are removed, the blind CPE compensation method 214A can be used as long as it continues to provide adequate performance. Other variations could also be implemented while still taking advantage of the blind CPE estimation techniques described herein.

It is noted that the disclosed embodiments can be used with respect to a variety of OFDM-based transmission schemes for RF communication systems. It is also noted that as used herein, a "radio frequency" or RF communications means an electrical and/or electro-magnetic signal conveying useful information and having a frequency from about 3 kilohertz (kHz) to thousands of gigahertz (GHz) regardless of the medium through which such signal is conveyed. The OFDM-based transmissions may be transmitted through a variety of mediums (e.g., air, free space, coaxial cable, optical fibers, copper wire, metal layers, and/or other RF transmission mediums). As one example, the disclosed embodiments could be used for millimeter (mm) wave transmissions between 30-300 GHz having wavelengths of 1-10 mm (e.g., a transmission range of 71-76 GHz) if OFDM-based modulation were used for the mm wave transmissions. In addition, the disclosed embodiments will likely be useful for 5G solutions up to 40 GHz where OFDM-based modulations are more likely to be implemented. For example, 5G frequency ranges and bands around 28 GHz, 39 GHz, and/or other frequency ranges or bands where OFDM-based modulation is used for RF transmissions will benefit from the blind CPE compensation techniques described herein for the disclosed embodiments. It is further noted that example wireless communication systems within which the disclosed blind CPE compensation techniques can be applied are also described in U.S. Published Patent Application No. 2015-0303936 (Ser. No. 14/257,944) and U.S. Published Patent Application No. 2015-0305029 (Ser. No. 14/691,339), each of which is hereby incorporated by reference in its entirety.

Advantageously, embodiments described may provide reduced overhead and/or latency in the beam management process, particularly in millimeter wave scenarios. More specifically, the embodiments may reduce the communication overhead between the BS and UE and may shorten the beam refinement procedure. This may be due to the dual use of the reference signals (e.g., SS) for both synchronization and nested beam linkage, as well as the BS potentially transmitting fewer narrow beams during its beam sweep. Additionally, the linkage between the narrow and wide beams provides the ability for the BS and UE to fallback to using the wider beam to communicate when the narrow beam quality is insufficient. This ability to fallback on the wider beam may advantageously increase the robustness of the system. This increased robustness may also reduce the need for procedures to recover from beam failure.

Advantageously, embodiments described may provide improved beam reporting, particularly in millimeter wave scenarios. More specifically, given that a UE may have limited computational capability, embodiments may accomplish an improvement in beam selection by more efficiently using the UE's limited computational capability to select the best beam(s). This may be particularly advantageous in the NR context given that relatively wide range of differing UE categories.

Radio Frequency Beam Management

The embodiments of the methods, or procedures, described in the FIGS. 15 through 18 may be performed by systems, including user equipment (UE) and base stations (e.g., eNB, gNB), whose hardware and software components are described in FIGS. 1 through 14 and which are further configured to perform the various steps, functions, operations, etc. described in the FIGS. 15 through 18 other portions of the instant disclosure.

A radio frequency beam pair link in the downlink is a link defined by a transmitting beam at the gNB and a receiving beam at the UE.

A radio frequency beam pair link in the uplink is a link defined by a transmitting beam at the UE and a receiving beam at the gNB.

A beam quality metric is information that indicates the quality of a radio frequency beam transmitted by a radio frequency transmitter and received by a radio frequency transmitter. The beam quality metric may be based on a received signal strength, a received signal quality, or a combination thereof. For example, a beam quality metric may be received signal strength indication (RSSI), reference signal received power (RSRP), synchronization signal received power (SSRP), signal to noise ratio (SNR), signal to interference plus noise ratio (SINR), channel quality information (CQI), rank information (RI), precoder matrix information (PMI), or other metrics.

A beam failure is an event where the beam quality of the beam failure detection reference signal (RS) that is associated with the beam triggers a pre-configured beam failure triggering condition.

Beam refinement means selecting a narrow beam that is different from the currently selected beam where the current beam might be broad or narrow, and the new beam provides improvement in beam quality metric over the current beam.

A beam failure recovery procedure is a procedure that is triggered by a beam failure and works to recover and re-establish a beam pair link between the gNB and the UE.

Beam switching means selecting a new broad or narrow beam that is different from the currently selected beam where the current beam might be broad or narrow, and the new beam may or may not provide improvement in beam quality metric over the current beam.

Beam broadening means selecting a broad beam that is different from the currently selected narrow beam where the current narrow beam is associated to the broad beam by virtue of being nested within the broad beam.

Embodiments are contemplated in which the beam broadening or refining may occur at the gNB and/or the UE.

Beam management definitions. Various definitions follow, which are taken primarily from the 3rd Generation Partnership Project, Technical Specification Group Radio Access Network, Study on New Radio Access Technology, Physical Layer Aspects (Release 14), which may be found at the perma-link http://www.3gpp.org/ftp/Specs/archive/38 series/38.802/38802-e00.zip.

Beam management: a set of L1/L2 (Level 1/Level 2) procedures to acquire and maintain a set of TRP(s) and/or UE beams that can be used for DL and UL transmission/reception, which include at least following aspects:
  Beam determination: TRP(s) or UE to select its own Tx/Rx beam(s).
  Beam measurement: TRP(s) or UE to measure characteristics of received beamformed signals.
  Beam reporting: UE to report information of beamformed signal(s) based on beam measurement.
  Beam sweeping: operation of covering a spatial area, with beams transmitted and/or received during a time interval in a predetermined way.
Beam correspondence
Tx/Rx beam correspondence at the TRP holds if at least one of the following is satisfied:
  The TRP is able to determine a TRP Rx beam for the uplink reception based on the UE's downlink measurement on the TRP's one or more Tx beams.
  The TRP is able to determine a TRP Tx beam for the downlink transmission based on the TRP's uplink measurement on the TRP's one or more Rx beams.
Tx/Rx beam correspondence at the UE holds if at least one of the following is satisfied:
  The UE is able to determine a UE Tx beam for the uplink transmission based on the UE's downlink measurement on the UE's one or more Rx beams.
  The UE is able to determine a UE Rx beam for the downlink reception based on the TRP's indication based on an uplink measurement on the UE's one or more Tx beams.
  The Capability indication of UE beam correspondence related information to the TRP is supported.
L1/L2 beam management procedures
The following DL L1/L2 beam management procedures are supported within one or multiple TRPs:
  P-1: is used to enable UE measurement on different TRP Tx beams to support selection of TRP Tx beams/UE Rx beam(s).
    For beamforming at the TRP, it typically includes a intra/inter-TRP Tx beam sweep from a set of different beams.
    For beamforming at the UE, it typically includes a UE Rx beam sweep from a set of different beams.
  P-2: is used to enable UE measurement on different TRP Tx beams to possibly change inter/intra-TRP Tx beam(s).
    From a possibly smaller set of beams for beam refinement than in P-1. Note that P-2 can be a special case of P-1.
  P-3: is used to enable UE measurement on the same TRP Tx beam to change the UE Rx beam in the case the UE uses beamforming.
Beam Reporting
At least network triggered aperiodic beam reporting is supported under P-1, P-2, and P-3 related operations.

UE measurement based on RS for beam management (at least CSI-RS) is composed of K (=total number of configured beams) beams, and the UE reports measurement results of N selected Tx beams, where N is not necessarily a fixed number. Note that the procedure based on RS for mobility purpose is not precluded.

Reporting information at least includes measurement quantities for N beam (s) and information indicating N DL Tx beam(s), if N<K. Specifically, when a UE is configured with K'>1 non-zero power (NZP) CSI-RS resources, a UE can report N' CRIs (CSI-RS Resource Indicator).

Higher layer parameters of UE configuration for beam reporting
  N≥1 reporting settings, M≥1 resource settings
    The links between reporting settings and resource settings are configured in the agreed CSI measurement setting.
    CSI-RS based P-1 & P-2 are supported with resource and reporting settings.
    P-3 can be supported with or without reporting setting.
  A reporting setting at least includes:
    Information indicating selected beam(s)
    L1 measurement reporting
    Time-domain behavior: e.g. aperiodic, periodic, semi-persistent
    Frequency-granularity if multiple frequency granularities are supported.
  A resource setting at least includes:
    Time-domain behavior: e.g. aperiodic, periodic, semi-persistent,
    RS type: NZP CSI-RS at least,
    At least one CSI-RS resource set, with each CSI-RS resource set having K≥1 CSI-RS resources.
      Some parameters of K CSI-RS resources can be the same, e.g. port number, time-domain behavior, density and periodicity if any.
Beam reporting
Two alternative schemes have been identified for beam reporting:
  Alt-1: TRP TX beam(s) received by UE RX beam set(s).
  Alt-2: TRP TX beam(s) received by UE antenna group(s).
Beam reporting Alt-1
The UE reports information about TRP Tx Beam(s) that can be received using selected UE Rx beam set(s).
An Rx beam set refers to a set of UE Rx beams that are used for receiving a DL signal.
  One example of how to construct the Rx beam set is that each of Rx beam in a UE Rx beam set corresponds to a selected Rx beam in each panel.
For UEs with more than one UE Rx beam set, the UE can report TRP Tx Beam(s) and an identifier of the associated UE Rx beam set per reported TX beam(s).
Different TRP Tx beams reported for the same Rx beam set can be received simultaneously at the UE.
Different TRP TX beams reported for a different UE Rx beam set may not be possible to be received simultaneously at the UE.
Beam reporting Alt-2
The UE reports information about TRP Tx Beam(s) per UE antenna group basis.
A UE antenna group refers to a receive UE antenna panel or subarray.

For UEs with more than one UE antenna group, the UE can report TRP Tx Beam(s) and an identifier of the associated UE antenna group per reported TX beam.

Different TX beams reported for different antenna groups can be received simultaneously at the UE.

Different TX beams reported for the same UE antenna group may not be possible to be received simultaneously at the UE Beam reporting NR also supports the following beam reporting considering L groups where L>=1 and each group refers to a Rx beam set (Alt1) or a UE antenna group (Alt2) depending on which alternative is adopted. For each group l, the UE reports at least the following information:
  Information indicating the group at least for some cases,
  Measurement quantities for $N_l$ beam (s),
    Support L1 RSRP and CSI report (when CSI-RS is for CSI acquisition),
  Information indicating N, DL Tx beam(s) when applicable.

This group-based beam reporting is configurable per UE basis. This group based beam reporting can be turned off per UE basis e.g., when L=1 or $N_l$=1. Note that no group identifier is reported when it is turned off.

Definition of Quasi-colocation (QCL)

Two antenna ports are said to be quasi co-located if properties of the channel over which a symbol on one antenna port is conveyed can be inferred from the channel over which a symbol on the other antenna port is conveyed. QCL supports the following functionalities at least:
  Beam management functionality: at least including spatial parameters
  Frequency/timing offset estimation functionality: at least including Doppler/delay parameters
  RRM management functionality: at least including average gain For DM-RS antenna ports, NR supports:
  All ports are quasi-colocated.
  Not all ports are quasi-colocated.
  DMRS ports grouping is supported, and DMRS ports within one group are QCL-ed, and DMRS ports in different groups are non-QCL-ed. NR supports with and without a downlink indication to derive QCL assumption for assisting UE-side beamforming for downlink control channel reception.

For CSI-RS antenna ports,
  Indication of QCL between the antenna ports of two CSI-RS resources is supported.
    By default, no QCL should be assumed between antenna ports of two CSI-RS resources.
    Partial QCL parameters (e.g., only spatial QCL parameter at UE side) should be considered.
  For downlink, NR supports CSI-RS reception with and without beam-related indication,
    When beam-related indication is provided, information pertaining to UE-side beamforming/receiving procedure used for CSI-RS-based measurement can be indicated through QCL to UE
    QCL information includes spatial parameter(s) for UE side reception of CSI-RS ports
  Indication of QCL assumption associated with subset of QCL parameters between the antenna ports of two RS resources is supported.
    By default (i.e., the UE is not indicated), antenna port(s) transmitted on different control channels cannot be assumed to be quasi-collocated except for spatial domain QCL assumptions.

Aspects of a beam management and recovery procedure will now be described. Due to the characteristics of a mobile radio channel, the quality of a beam can vary between very high and very low, and changes might happen very fast or gradually. As beam failure is an undesirable event and recovering from such a failure can cause an interruption in the connection between the gNB and UE, we aim to preempt such a failure when possible. When a beam failure occurs in spite of attempts to preempt it, we aim to recover from the failure with minimum latency without triggering Radio Link Failure.

Figure 15:
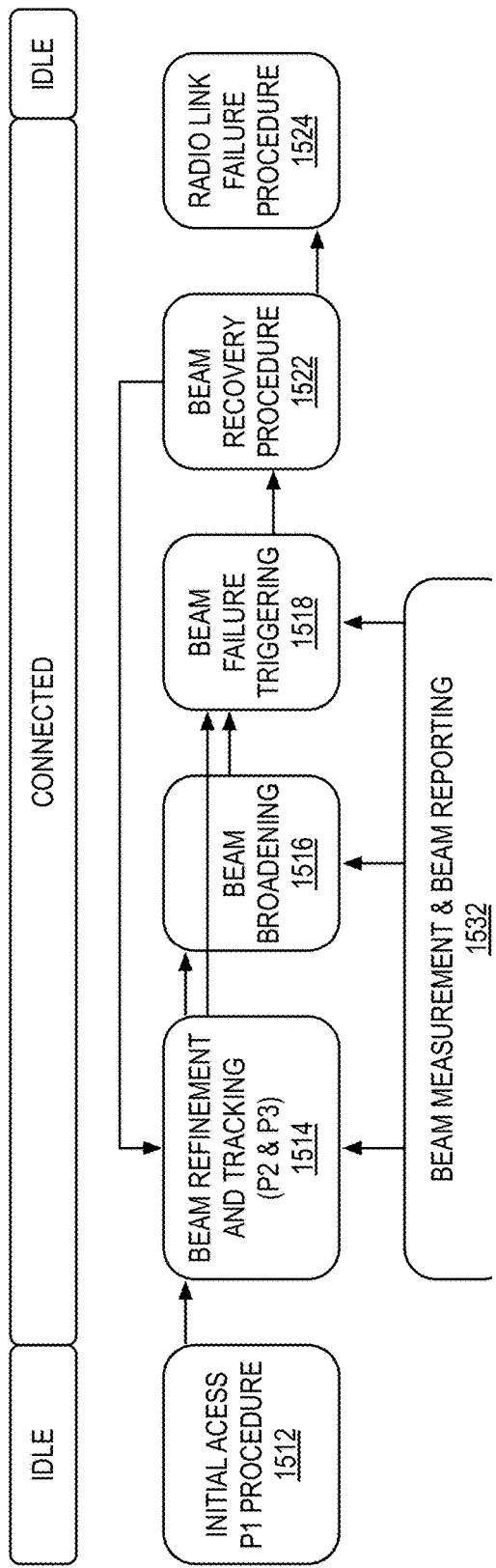
FIG. 15 is a diagram illustrating interplay of beam management, beam recovery and radio link failure.

FIG. 15 is a diagram illustrating interplay of beam management, beam recovery and radio link failure. During an idle state, per block 1512 an initial access procedure includes the P1 procedure where a broad beam-based link will be setup between the gNB and the UE. Once the UE is in the RRC Connected state, per block 1532 UE Specific CSI-RS are configured and beam measurement and reporting settings are also configured. This is followed, per block 1514, by beam refinement where the narrow beam based PDCCH and PDSCH are setup. Per block, the PDCCH can also be optionally transmitted on broad beams and/or multiple beams for robustness. The beam pair link quality is tracked with beam measurements (block 1532) using a combination of thresholds and timers. This tracking can happen at either the gNB or the UE as explained below. Depending on the tracking algorithm, per block 1516 beam broadening is attempted and if that is unsuccessful, per block 1518 beam failure can be triggered. Multiple threshold levels can be set to decide whether to attempt beam refinement and broadening or directly trigger beam failure. Additionally, different beam quality metrics may be associated with the different threshold levels. For example, a first beam quality metric may be associated with a threshold level used to determine whether to perform beam switching/broadening (e.g., a channel quality beam quality metric, e.g., CQI or PMI or RI), whereas a second beam quality metric may be associated with a threshold level used for beam failure detection (e.g., a received signal strength beam quality metric, e.g., RSSI or RSRP or reference signal received quality (RSRQ)). If per block 1522 multiple beam failure recovery request transmission attempts are unsuccessful, then per block 1524 the Radio Link Failure procedure is initiated.

In order to allow flexible integration of beam management into procedures like RLM, RLF or link adaptation algorithms, a set of configurable conditions will be beneficial to trigger different actions such as:
  Beam switching,
  Beam broadening/combining,
  Fallback from a narrow beam to a wide beam, and
  Beam failure recovery.

The actions are supported by various functionalities which are implemented on either the gNB, the UE or can be common to both. Two specific new functionalities to aid in optimal beam management and recovery will be described shortly: a) Multiple threshold settings for beam failure triggering, and b) Beam broadening.

Aspects of threshold setting for Beam Failure Triggering will now be described. The following beam triggering process may robustly and efficiently handle multiple types of beam failure while minimizing the latency of the beam recovery procedure. Support for multiple thresholds for the UE may be supported: a) Beam Switching threshold and b) Control channel beam failure threshold.

Figure 16:
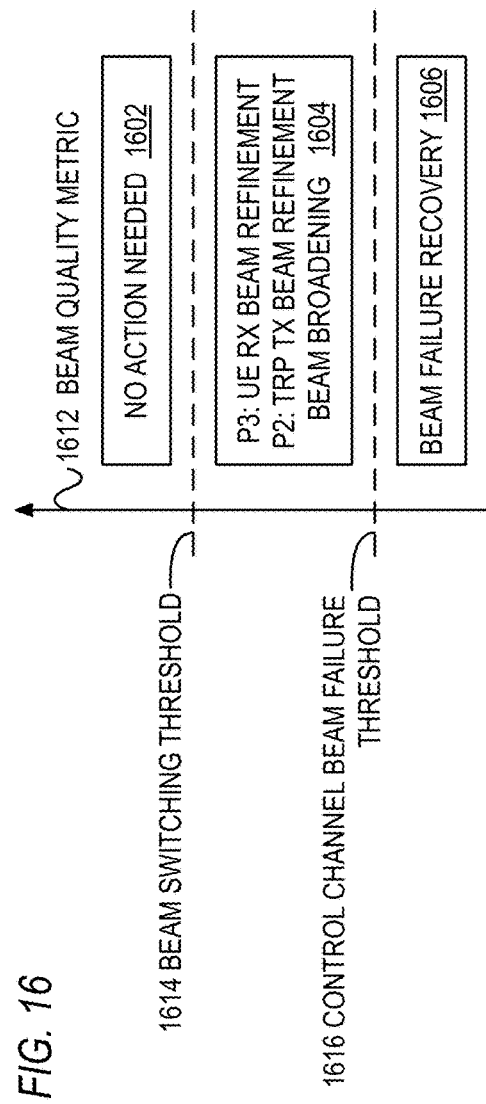
FIG. 16 is a diagram illustrating beam management and beam recovery.

FIG. 16 is a diagram illustrating beam management and beam recovery. The diagram includes a beam quality metric 1612 measured along a vertical axis, with worse beam quality in the downward direction and better beam quality in the upward direction. A beam switching threshold 1614 and a control channel beam failure threshold 1616 are shown. The beam switching threshold 1614 indicates a higher beam quality than the control channel beam failure threshold 1616 and is used to trigger at least the Type 1 beam failure. The control channel beam failure threshold 1616 is used to trigger at least the Type 2 beam failure. Scenarios that might lead to beam failure may differ in terms of how fast and how severely the beam quality deteriorates. A trigger condition consists of a measurement metric related threshold and a timer for which the measurement metric violates the threshold. A set of at least two trigger conditions that might have different thresholds and timers is defined. The threshold and the timer of each of the trigger conditions may be reconfigured.

Aspects of beam broadening will now be described. The SS or the UE Specific CSI-RS may be used as the DL-RS for the PDCCH. The CSI-RS may have a narrow beam width and the SS may have a broad beam width. The PDCCH may initially be QCL'ed with the SS until the P2/P3 beam refinement procedure is performed and the UE can be configured with the UE specific CSI-RS.

A symmetric mechanism is to use the nested structure of multiple CSI-RS that are QCLed with a SS beam to allow for a smooth recovery with low latency from a beam failure. For example, when a PDCCH that is configured with a narrow beam CSI-RS triggers a beam failure using the second threshold, the narrow beam is lost due to gradual motion or rotation. In this case, it is quite likely that the neighboring beams will be good enough and broadening the beam that is serving the UE may be considered. The SS within which the CSI-RS is nested may be used.

An example of the nested structure is shown in FIGS. 2A, 2B, 3A and 3B. When the PDCCH is associated with a UE Specific CSI-RS as its DL RS, it can attempt to broaden its serving beam before proceeding with the normal beam recovery process to reduce the beam recovery latency. Beam broadening is supported to reduce transmission of beam recovery requests.

Aspects of the various roles of the UE and gNB in beam management and recovery will now be described. The beam recovery procedure may be controlled by the gNB and the UE via setting the relevant configurable thresholds and timers. Alternative methods for setting up the thresholds and timers at the gNB and the UE will now be described in which the beam management and recovery is controlled and initiated by the gNB or by the UE. First, beam management and recovery with UE assistance will be described.

Figure 17A:
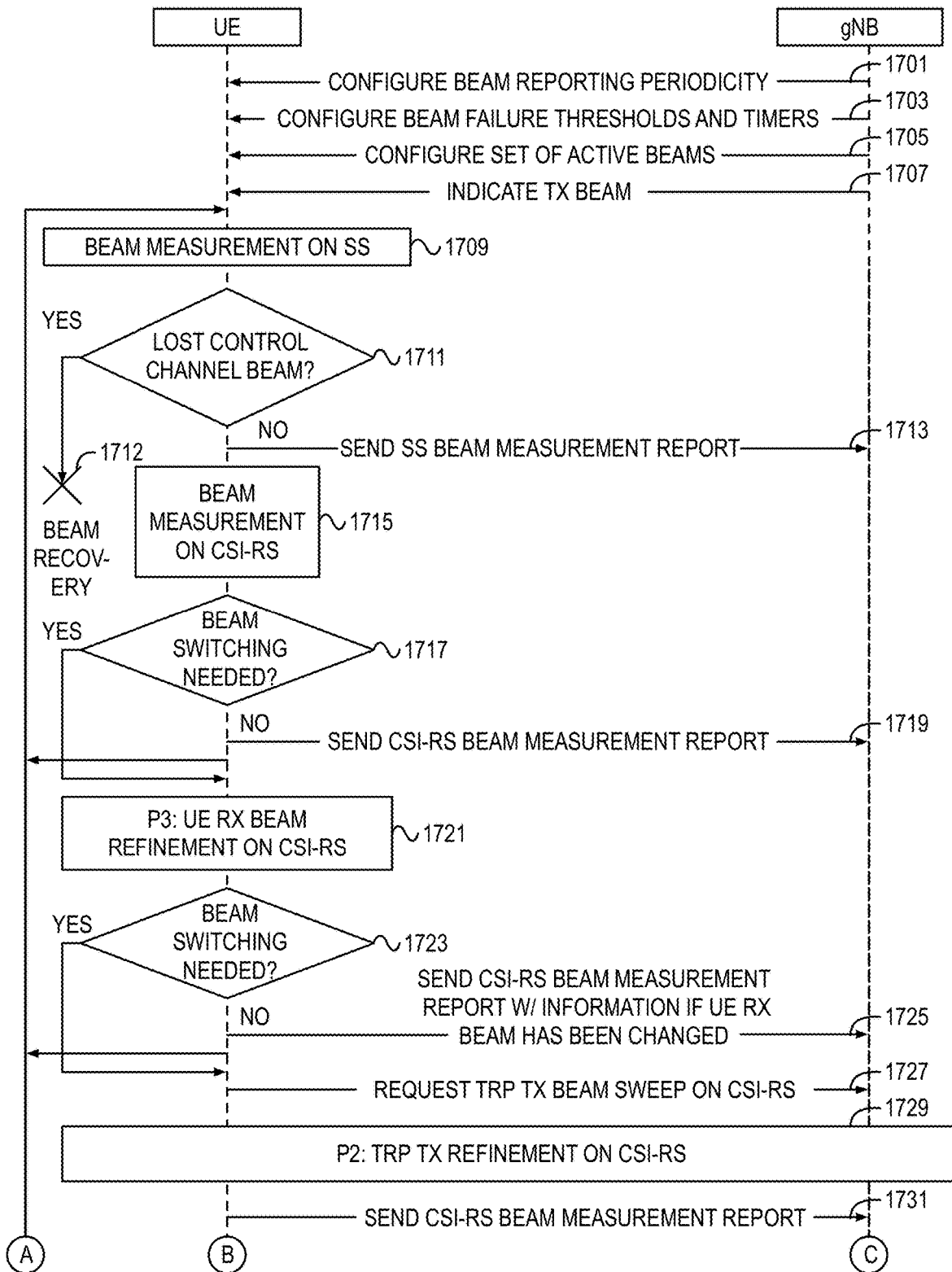
FIG. 17 (collectively FIGS. 17A and 17B) is a signal diagram illustrating a UE-initiated beam management method.
Figure 17B:
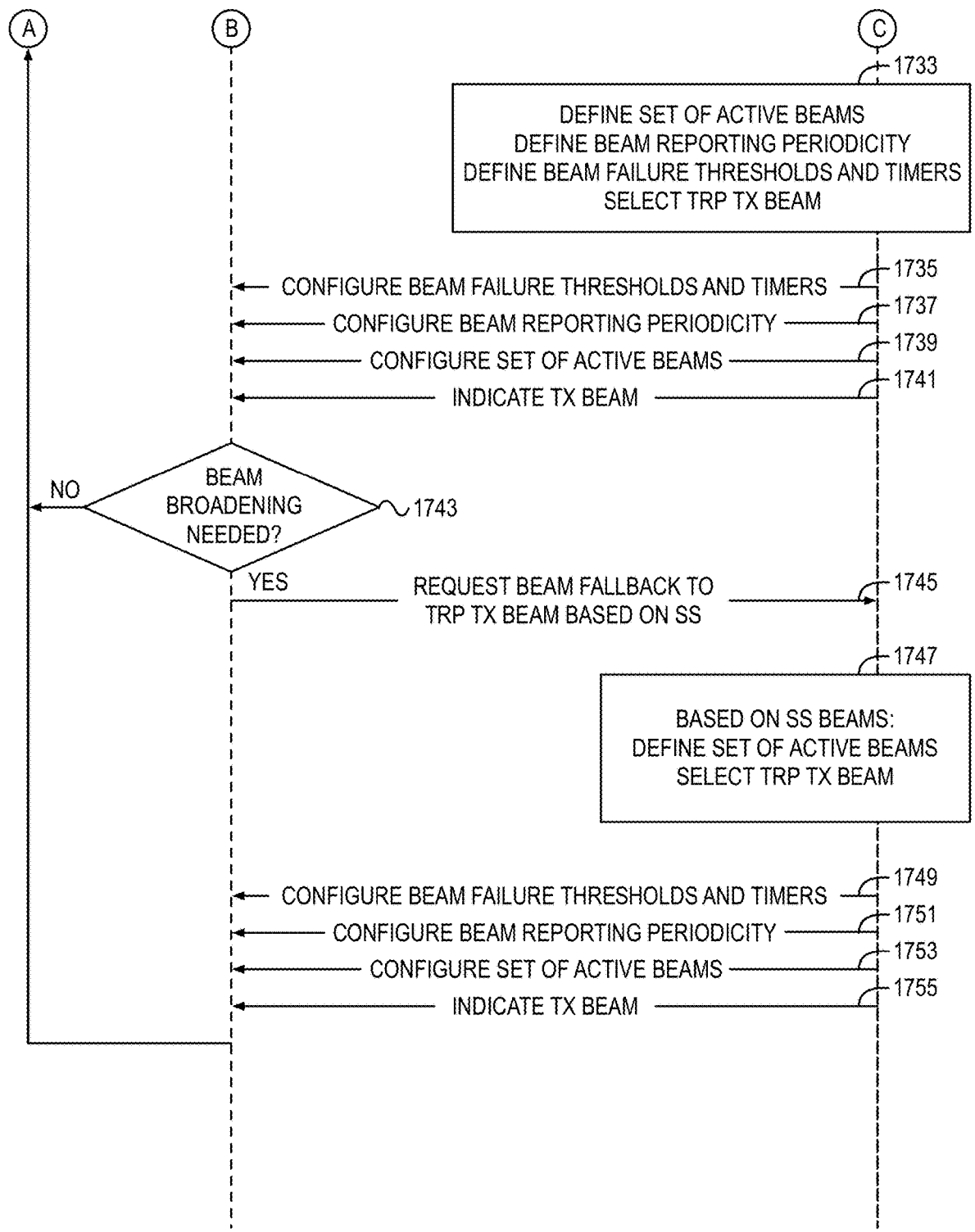

FIG. 17 (collectively FIGS. 17A and 17B) is a signal diagram illustrating a UE-initiated beam management method. In the UE-controlled method, the UE is the primary controller of the beam management and recovery procedures, whereas the gNB configures the UE through L2/L3 (Level 3) signaling. A UE in RRC_CONNECTED state may have the following beam management tasks.

First, the UE provides beam measurement reports to the gNB according to the periodicity configured by the gNB. This includes appropriate beam measurements on the set of active beams configured by gNB. The UE can be RRC configured by the gNB for a specific periodicity of the Beam Measurement Report. The measurement metric may be the L1 RSRP on SS and/or UE Specific CSI-RS that have been configured by the gNB as the active beam set.

Second, the UE may optionally initiate beam switching via the P2/P3 beam refinement procedure based on its monitoring of the beam quality metric as described above with respect to FIG. 16. The UE may optionally select a new RX beam as the outcome of the P3 procedure. This can be triggered by the UE or by the gNB. The UE also initiates beam broadening when necessary.

Third, the UE may initiate and signal Beam Failure triggering. The UE may trigger a beam failure event via monitoring the beam quality of the serving beam for the DL RS used for beam management. The beam quality metric can be RSSI or SINR. A beam failure is triggered when the beam quality metric falls below a threshold and stays below the threshold for a period of time defined by a timer. The threshold setting and timer values may be configured by the gNB via L2/L3 signaling.

As shown in FIG. 17, initially, the gNB signals the UE to configure the beam reporting periodicity 1701, configure the beam failure thresholds and timers 1703, configure the set of active beams 1705, and indicate the TX beam 1707. Subsequently, the UE performs beam measurement on the SS 1709. The UE then determines whether the control channel beam has been lost 1711. If so, beam recovery 1712 is performed. If not, the UE sends an SS beam measurement report to the gNB 1713. The UE also performs beam measurement on CSI-RS 1715. The UE then determines whether beam switching is needed 1717. If not, the UE sends a CSI-RS beam measurement report to the gNB 1719 and flow returns to 1709 in which the UE performs beam measurement on SS. Otherwise, UE TX beam refinement of CSI-RS is performed according to P3 1721. Next, the UE determines again whether beam switching is needed 1723. If not, the UE sends a CSI-RS beam measurement report to the gNB with information indicating whether or not the UE RX beam was changed 1725 and flow returns to 1709. Otherwise, the UE signals the gNB to request a TRP TX beam sweep on CSI-RS 1727. Subsequently, TRP TX beam refinement on CSI-RS is performed according to P2 1729, and the UE sends a CSI-RS beam measurement report to the gNB 1731. The gNB defines a set of active beams, defines a beam reporting periodicity, defines beam failure thresholds and timers, and selects a TRP TX beam 1733. The gNB signals the UE to configure the beam failure thresholds and timers 1735, configure the beam reporting periodicity 1737, configure the set of active beams 1739, and indicate the TX beam 1741. Next, the UE determines again whether beam broadening is needed 1743. If not, flow returns to 1709. If so, the UE signals the gNB to request beam fallback to the TRP TX beam based on the SS 1745. Subsequently, based on SS beams, the gNB defines a set of active beams and selects a TRP TX beam 1747. The gNB then signals the UE to configure the beam failure thresholds and timers 1749, configure the beam reporting periodicity 1751, configure the set of active beams 1753, and indicate the TX beam 1755, and flow returns to 1709.

Figure 18A:
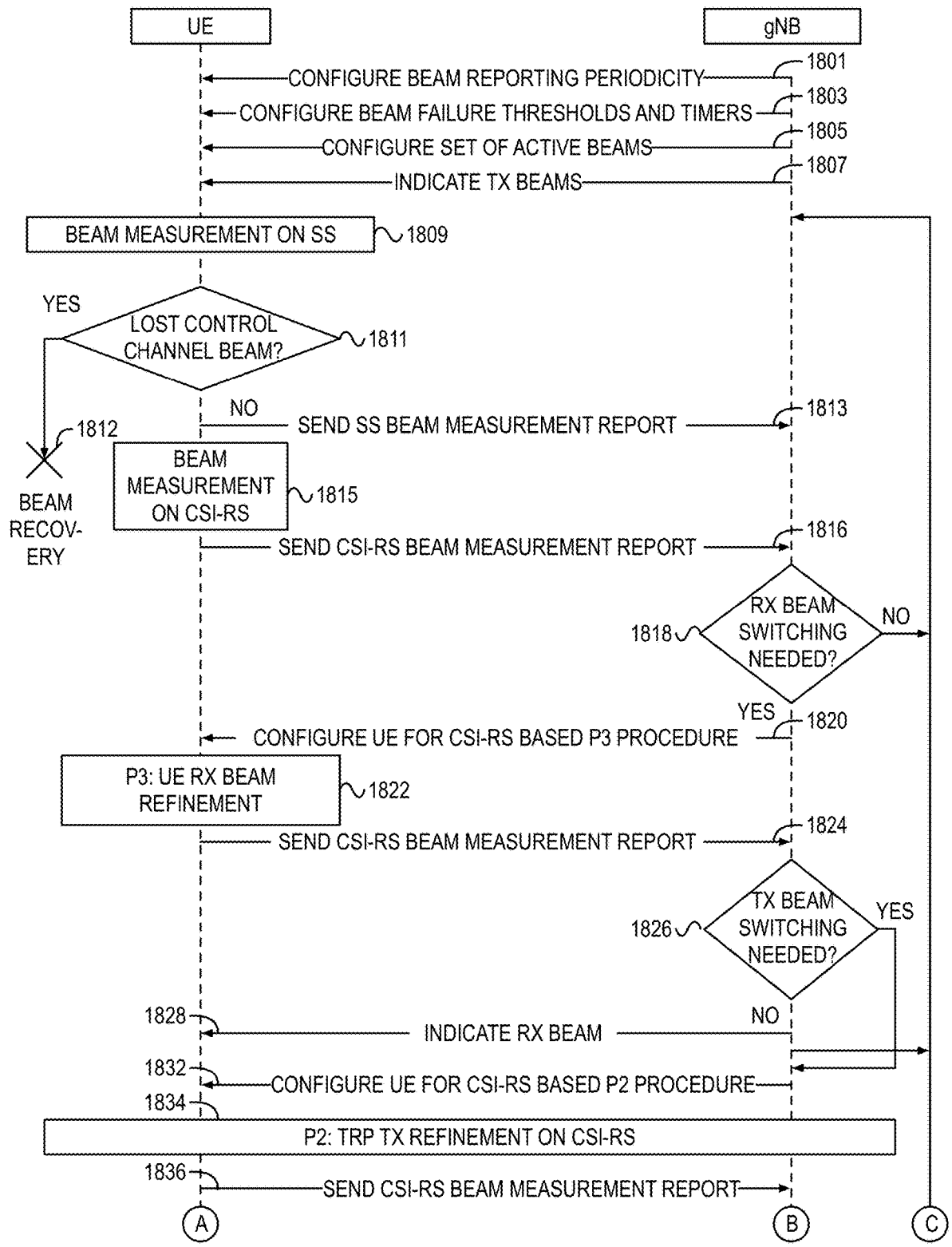
FIG. 18 (collectively FIGS. 18A and 18B) is a signal diagram illustrating a gNB-initiated beam management method.
Figure 18B:
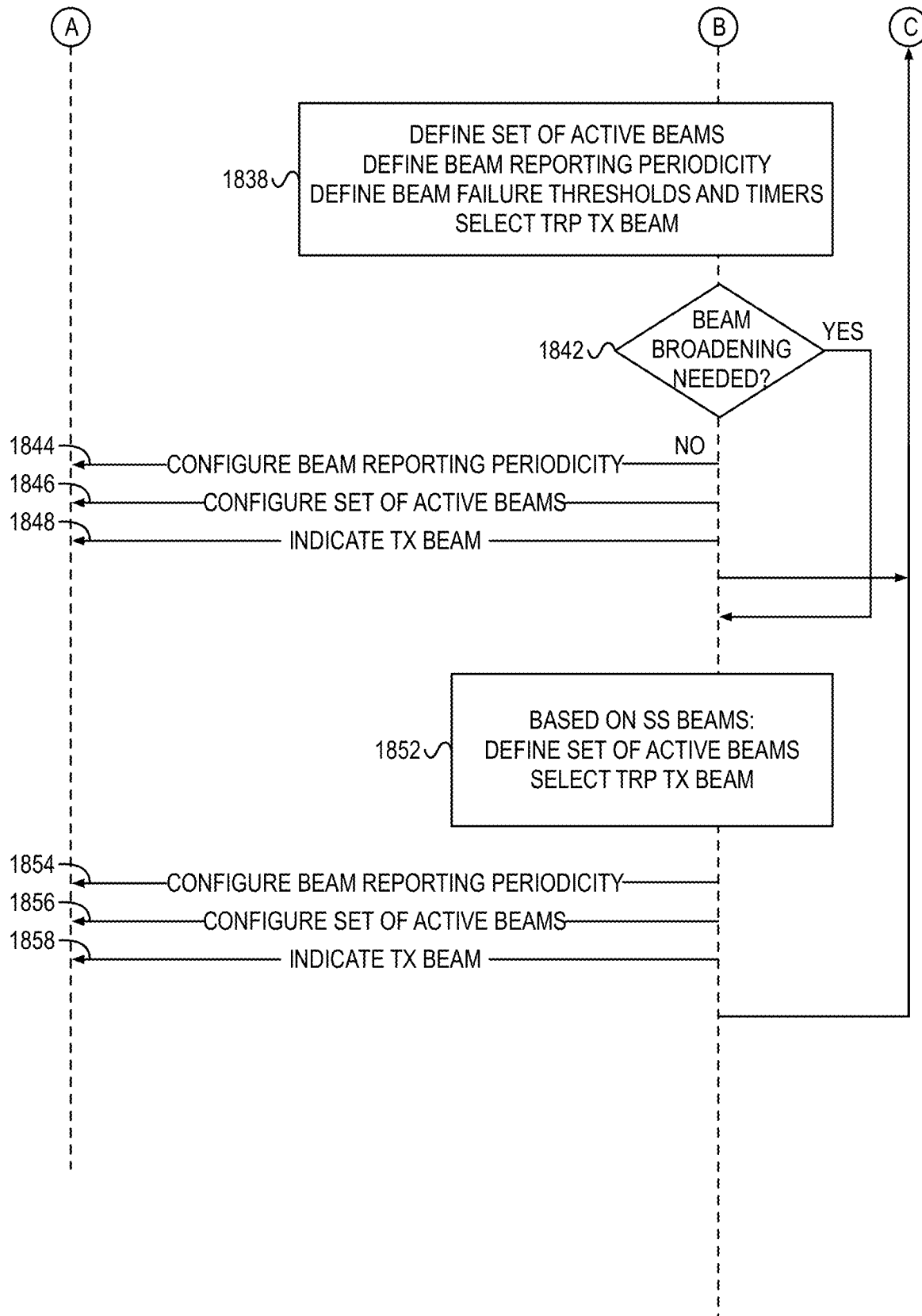

FIG. 18 (collectively FIGS. 18A and 18B) is a signal diagram illustrating a gNB-initiated beam management method. In the gNB-controlled method, the gNB is the primary controller of the beam management and recovery procedures, whereas the UE is configured by the gNB through L2/L3 signaling for the appropriate beam measurement and reporting settings. FIG. 18 illustrates a concise view of a beam management embodiment for a UE in CONNECTED state including how different thresholds trigger different actions. The gNB may have the following tasks for beam management of a UE in RRC_CONNECTED state.

First, the gNB configures UE Specific CSI-RS for each UE. Second, the gNB indicates the set of active beams and selected RX and TX beam to the UE through L2/L3 signaling. Third, the gNB configures Beam Measurement Settings and Beam Reporting Settings. The gNB may configure periodic Beam Measurement reports from each UE. The periodicity may be configured to be the same or different for every UE. In addition to the periodic Beam measurement reports, additional aperiodic beam measurement reports can also be scheduled by the gNB. A Beam Measurement Report timer may be associated with the reports with the largest timer value set to the time interval between two successive reports from a specific UE. Fourth, in preemptive beam switching, the gNB can track the beam quality of the serving beam and other beams in the active beam set that are reported by the UE in the beam measurement report. If a beam in the active set is better than the serving beam, the gNB may switch or broaden the serving beam for the UE and signal the beam change. Fifth, the gNB may initiate P2/P3 procedure(s) for beam refinement. Sixth, Beam Failure triggering may be initiated by the gNB. The gNB may trigger a beam failure if 1) the reported serving beam quality is lower than a threshold for a specific number of successive reports or 2) the Beam Measurement Report timer expires, i.e. the link was not good enough for UE to successfully receive the beam measurement configuration or send back the beam measurement report.

As shown in FIG. 18, initially, the gNB signals the UE to configure the beam reporting periodicity 1801, configure the beam failure thresholds and timers 1803, configure the set of active beams 1805, and indicate the TX beam 1807. Subsequently, the UE performs beam measurement on the SS 1809. The UE then determines whether the control channel beam has been lost 1811. If so, beam recovery 1812 is performed. If not, the UE sends an SS beam measurement report to the gNB 1813. The UE also performs beam measurement on CSI-RS 1815. The UE then sends a CSI-RS beam measurement report to the gNB 1816. The gNB determines whether RX beam switching is needed 1818. If not, the gNB flow returns to the state after 1807 in which the gNB waits for the UE to send an SS beam measurement report. Otherwise, the gNB signals the UE to configure the UE for a CSI-RS based P3 procedure 1820. The UE performs UE RX beam refinement according to P3 1822. The UE then sends a CSI-RS beam measurement report 1824. The gNB then determines whether TX beam switching is needed 1826. If not, the gNB signals the UE to indicate the RX beam 1828 and the gNB flow returns to the state after 1807. Otherwise, the gNB configures the UE for a CSI-RS based P2 procedure 1832. TRP TX refinement on CSI-RS is then performed according to P2 1834. The UE then sends a CSI-RS beam measurement report to the gNB 1836. The gNB then defines a set of active beams, defines a beam reporting periodicity, defines beam failure thresholds and timers, and selects a TRP TX beam 1838. The gNB then determines whether beam broadening is needed 1842. If not, the gNB signals the UE to configure the beam reporting periodicity 1844, configure the set of active beams 1846, and indicate the TX beam 1848, and the gNB flow returns to the state after 1807. Otherwise, based on SS beams, the gNB defines a set of active beams and selects a TRP TX beam 1852. Then, the gNB signals the UE to configure the beam reporting periodicity 1854, configure the set of active beams 1856, and indicate the TX beam 1858, and the gNB flow returns to the state after 1807.

Table 1 below summarizes various aspects of the roles of the UE and gNB in beam management and recovery. In particular, beam failure recovery may be initiated by either the UE or gNB. In some cases, gNB-initiated beam failure recovery may lower recovery time.

TABLE 1

|  | UE Controlled | gNB Controlled |
|---|---|---|
| Beam Failure Triggering | UE triggers Beam Failure | gNB triggers Beam Failure |
| Threshold to declare Beam Failure | Configured at UE by gNB via L2/L3 message | Implemented within gNB and independent of the UE |
| Timer to declare Beam Failure | Configured at UE by gNB via L2/L3 message | Configured at gNB. Implicitly set using number of successive Beam Reports Or explicit Beam Measurement Report timer implemented at gNB |
| Latency to recover from Beam Failure | Medium to High (Timer expiry period + Wait till next PRACH window + Beam Recovery Request Response monitoring time) | Low to Medium (Beam reporting period + Timer expiry period + Beam response window) |

It is noted that the techniques described herein can be used for massive MIMO (multiple input, multiple output) cellular telecommunication systems such as those described in U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety. It is further noted that different and/or additional features can also be implemented, as desired, and related systems and methods can be utilized as well. Such massive MIMO communication systems can be used for 5G dynamic TDD (time division duplex) air interfaces. The 5G (5$^{th}$ generation) mobile telecommunications system is able to span a wide variety of deployment scenarios (e.g., Rural, Urban Macro, Dense Urban, Indoor, etc.) in a flexible and scalable manner. In particular, massive MIMO reciprocity-based TDD air interfaces allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC).

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the new frame structures described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for teaching those skilled in the art the manner of carrying out the invention. It is to be understood that the forms of the invention herein shown and described are to be taken as present embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. A method for performing radio frequency beam management and recovery in communication between a base station (BS) and a user equipment (UE), the method comprising:
configuring first and second thresholds;
wherein the second threshold indicates a lower beam quality than the first threshold;
configuring first and second periods respectively associated with the first and second thresholds;
evaluating a beam quality metric of a current beam against the first and second thresholds and the associated first and second periods;
performing beam switching and/or beam broadening in response to determining the beam quality metric of the current beam falls below the first threshold for at least the first period;
performing a beam failure recovery procedure in response to determining the beam quality metric of the current beam falls below the second threshold for at least the second period; and
wherein said evaluating a beam quality metric of the current beam against the first and second thresholds and the first and second periods is performed in parallel such that when the beam quality falls below the second threshold for at least the second period, said performing the beam failure recovery procedure is directly triggered without said performing beam switching and/or beam broadening being intermediately triggered, and when the beam quality falls below the first threshold for at least the first period without falling below the second threshold for at least the second period said performing beam switching and/or beam broadening is triggered.

2. The method of claim 1,
wherein said evaluating a beam quality metric of the current beam against the first and second thresholds and the associated first and second periods is performed by the UE.

3. The method of claim 1,
wherein said evaluating a beam quality metric of the current beam against the first and second thresholds and the associated first and second periods is performed by the BS.

4. The method of claim 3, further comprising:
receiving, by the BS from the UE, beam reports to use to perform said evaluating the beam quality metric of the current beam against the first and second thresholds and the associated first and second periods.

5. The method of claim 1, further comprising:
performing beam refinement in response to determining the beam quality metric of the current beam rises above the first threshold, after said performing beam switching and/or beam broadening in response to determining the beam quality metric of the current beam falls below the first for at least the first period.

6. The method of claim 1, further comprising:
performing beam switching and/or beam broadening in response to determining the beam quality metric of the current beam rises above the second threshold, after said performing a beam failure recovery procedure in response to determining the beam quality metric of the current beam falls below the second threshold for at least the second period.

7. The method of claim 1,
wherein the beam quality metric is based on a received signal strength, a received signal quality, or a combination thereof.

8. The method of claim 7,
wherein the beam quality metric comprises one or more or a combination of the following list:
received signal strength indication (RSSI);
reference signal received power (RSRP);
synchronization signal received power (SSRP);
signal to noise ratio (SNR);
signal to interference plus noise ratio (SINR);
channel quality information (CQI);
rank information (RI); and
precoder matrix information (PMI).

9. The method of claim 1,
wherein said evaluating a beam quality metric of the current beam against the first and second thresholds and the associated first and second periods comprises:
evaluating a first beam quality metric of the current beam against the first threshold for at least the first period; and
evaluating a second beam quality metric of the current beam against the second threshold for at least the second period.

10. The method of claim 9,
wherein the first beam quality metric comprises a channel quality beam quality metric; and
wherein the second beam quality metric comprises a received signal strength beam quality metric.

11. The method of claim 9,
wherein the first and second beam quality metrics are different beam quality metrics;
wherein said evaluating the first beam quality metric of the current beam against the first threshold and the first period, said evaluating the second beam quality metric of the current beam against the second threshold and the second period, said performing beam switching and/or beam broadening in response to determining the beam quality metric of the current beam falls below the first threshold for at least the first period, and said performing a beam failure recovery procedure in response to determining the beam quality metric of the current beam subsequently falls below the second threshold for at least the second period are performed for both a first channel on the current beam and for a second channel on the current beam;
wherein the first channel and the second channel are different channels, and
wherein the first channel and the second channel are from the list comprising:
a physical downlink shared channel (PDSCH);
a physical downlink control channel (PDCCH); and
a physical broadcast channel (PBCH).

12. The method of claim 1, further comprising:
associating a narrower beam and a broader beam between the BS and the UE, wherein the current beam is the narrower beam;
using the narrower beam, rather than the broader beam, to transfer user data between the BS and the UE;
evaluating a beam quality metric of the narrower beam against a threshold; and
switching to using the broader beam, rather than the narrower beam, to transfer user data between the BS and the UE in response to determining the beam quality metric of the narrower beam falls below the threshold.

13. A base station (BS) or user equipment (UE) for performing radio frequency beam management and recovery in communication with another UE/BS, wherein if the BS or UE is a BS, the other UE/BS is a UE and if the BS or UE is a UE, the other UE/BS is a BS, comprising:
a memory, configured to store first and second thresholds and first and second periods respectively associated with the first and second thresholds;
wherein the second threshold indicates a lower beam quality than the first threshold;
a processor, configured to:
evaluate a beam quality metric of a current beam against the first and second thresholds and the associated first and second periods;
perform beam switching and/or beam broadening in response to determining the beam quality metric of the current beam falls below the first threshold for at least the first period;
perform a beam failure recovery procedure in response to determining the beam quality metric of the current beam falls below the second threshold for at least the second period; and
wherein said evaluating a beam quality metric of the current beam against the first and second thresholds and the first and second periods is performed in parallel such that when the beam quality falls below the second threshold for at least the second period, said performing the beam failure recovery procedure is directly triggered without said performing beam switching and/or beam broadening being intermediately triggered, and when the beam quality falls below the first threshold for at least the first period without falling below the second threshold for at least the second period said performing beam switching and/or beam broadening is triggered.

14. The BS/UE of claim 13,
wherein the processor is further configured to:
perform beam refinement in response to determining the beam quality metric of the current beam rises above the first threshold, after performing beam switching and/or beam broadening in response to determining the beam quality metric of the current beam falls below the first threshold for at least the first period.

15. The BS/UE of claim 13, further comprising:
wherein the processor is further configured to:
perform beam switching and/or beam broadening in response to determining the beam quality metric of the current beam rises above the second threshold, after performing a beam failure recovery procedure in response to determining the beam quality metric of the current beam falls below the second threshold for at least the second period.

16. The BS/UE of claim 13,
wherein to evaluate a beam quality metric of the current beam against the first and second thresholds and the associated first and second periods, the processor is configured to:
evaluate a first beam quality metric of the current beam against the first threshold for at least the first period; and
evaluate a second beam quality metric of the current beam against the second threshold for at least the second period.

17. The BS/UE of claim 16, further comprising:
wherein the first and second beam quality metrics are different beam quality metrics;
wherein said evaluating the first beam quality metric of the current beam against the first threshold and the first period, said evaluating the second beam quality metric of the current beam against the second threshold and the second period, said performing beam switching and/or beam broadening in response to determining the beam quality metric of the current beam falls below the first threshold for at least the first period, and said performing a beam failure recovery procedure in response to determining the beam quality metric of the current beam subsequently falls below the second threshold for at least the second period are performed for both a first channel on the current beam and for a second channel on the current beam;
wherein the first channel and the second channel are different channels; and
wherein the first channel and the second channel are from the list comprising:
a physical downlink shared channel (PDSCH);
a physical downlink control channel (PDCCH); and
a physical broadcast channel (PBCH).

18. The BS/UE of claim 13,
wherein the processor is further configured to:
associate a narrower beam and a broader beam between the BS and the UE, wherein the current beam is the narrower beam;

use the narrower beam, rather than the broader beam, to transfer user data between the BS and the UE;

evaluate a beam quality metric of the narrower beam against a threshold; and switch to using the broader beam, rather than the narrower beam, to transfer user data between the BS and the UE in response to determining the beam quality metric of the narrower beam falls below the threshold.

19. A non-transitory computer-readable medium having instructions stored thereon that are capable of causing or configuring a computing system to perform operations for performing radio frequency beam management and recovery in communication between a base station and a user equipment (UE), the operations comprising:

configuring first and second thresholds, wherein the second threshold indicates a lower beam quality than the first threshold;

configuring first and second periods respectively associated with the first and second thresholds;

evaluating a beam quality metric of a current beam against the first and second thresholds and the associated first and second periods;

performing beam switching and/or beam broadening in response to determining the beam quality metric of the current beam falls below the first threshold for at least the first period;

performing a beam failure recovery procedure in response to determining the beam quality metric of the current beam falls below the second threshold for at least the second period; and wherein said evaluating a beam quality metric of the current beam against the first and second thresholds and the first and second periods is performed in parallel such that when the beam quality falls below the second threshold for at least the second period, said performing the beam failure recovery procedure is directly triggered without said performing beam switching and/or beam broadening being intermediately triggered, and when the beam quality falls below the first threshold for at least the first period without falling below the second threshold for at least the second period said performing beam switching and/or beam broadening is triggered.

* * * * *